United States Patent
Kim et al.

(10) Patent No.: US 9,841,220 B2
(45) Date of Patent: Dec. 12, 2017

(54) REFRIGERATOR AND METHOD OF CONTROLLING A REFRIGERATOR

(71) Applicant: LG ELECTRONICS INC., Seoul (KR)

(72) Inventors: Hosan Kim, Seoul (KR); Jangseok Lee, Seoul (KR); Yonghun Suh, Seoul (KR); Sung Jhee, Seoul (KR); Hyoungkeun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 14/478,600

(22) Filed: Sep. 5, 2014

(65) Prior Publication Data

US 2015/0059370 A1     Mar. 5, 2015

(30) Foreign Application Priority Data

Sep. 5, 2013 (KR) .......................... 10-2013-0106478
Sep. 5, 2013 (KR) .......................... 10-2013-0106479
Jul. 8, 2014 (KR) .......................... 10-2014-0085253

(51) Int. Cl.
     *F25D 17/06*      (2006.01)
     *F25B 5/00*      (2006.01)
     (Continued)

(52) U.S. Cl.
     CPC .............. *F25D 17/067* (2013.01); *F25B 5/00* (2013.01); *F25B 49/00* (2013.01); *F25B 49/027* (2013.01);
     (Continued)

(58) Field of Classification Search
     CPC ................. F25D 21/14; F25D 2321/14; F25D 2321/141; F25B 2500/14; F25B 2600/11;
     (Continued)

(56) References Cited

U.S. PATENT DOCUMENTS 2,403,528 A * 7/1946 Higham .................. F25B 39/04
     62/507
4,953,365 A * 9/1990 Lang ........................ A23L 3/361
     198/778

(Continued)

FOREIGN PATENT DOCUMENTS

CN      1199850      11/1998
CN      1886626      12/2006

(Continued)

OTHER PUBLICATIONS

Chinese Office Action dated Oct. 20, 2016. (English Translation).

(Continued)

*Primary Examiner* — Jonathan Bradford
(74) *Attorney, Agent, or Firm* — KED & Associates, LLP

(57) ABSTRACT

A refrigerator and a method of controlling a refrigerator are provided. The refrigerator may include a machine room defined in or at one side of a storage compartment, a base that defines a bottom surface of the machine room, a compressor seated on the base to compress a refrigerant, a condenser that condenses a refrigerant compressed in the compressor, the condenser being disposed on or at one side of the compressor, a drain pan disposed on the base to store condensed water generated in the condenser, and a fan assembly coupled to the base to generate an air flow within the machine room. The fan assembly may include a plurality of condensation fans.

18 Claims, 18 Drawing Sheets

(51) Int. Cl.
*F25B 49/00* (2006.01)
*F25B 49/02* (2006.01)
*F25D 21/14* (2006.01)

(52) U.S. Cl.
CPC ...... *F25D 21/14* (2013.01); *F25B 2341/0661* (2013.01); *F25B 2600/111* (2013.01); *F25B 2600/2511* (2013.01); *F25B 2700/172* (2013.01); *F25D 2321/141* (2013.01); *Y02B 30/743* (2013.01)

(58) Field of Classification Search
CPC .......... F25B 2600/111; F25B 2600/112; F25B 2700/172; F25B 2700/173
See application file for complete search history.

(56) References Cited

U.S. PATENT DOCUMENTS

| | | | | |
|---|---|---|---|---|
| 5,150,583 A | * | 9/1992 | Jaster | F25B 1/10 62/179 |
| 5,502,983 A | * | 4/1996 | Dasher | F25B 39/04 165/150 |
| 7,377,120 B2 | * | 5/2008 | Zikes | F24F 11/0009 62/175 |
| 8,291,721 B2 | * | 10/2012 | Stauter | B60H 1/3229 62/239 |
| 2004/0016255 A1 | * | 1/2004 | Kim | F25D 23/003 62/258 |
| 2011/0030402 A1 | | 2/2011 | Shinya et al. | |
| 2012/0023981 A1 | * | 2/2012 | Chae | F25B 5/02 62/115 |

FOREIGN PATENT DOCUMENTS

| | | |
|---|---|---|
| CN | 101684979 | 3/2010 |
| JP | H10-2625 | 1/1998 |
| JP | 2005/098627 | 4/2005 |
| KR | 10-2007-0051104 | 5/2007 |
| KR | 10-2008-0103851 | 11/2008 |
| KR | 10-2008-0122241 | 12/2008 |
| KR | 10-2012-0011278 | 2/2012 |
| KR | 10-2013-0096964 | 9/2013 |
| WO | WO 2008/100255 | 8/2008 |
| WO | WO 2011/112500 | 9/2011 |

OTHER PUBLICATIONS

Korean Office Action dated Mar. 21, 2016.
Chinese Office Action dated Apr. 5, 2016.
Korean Office Action dated Oct. 27, 2015.
European Search Report dated Feb. 27, 2015.

\* cited by examiner

REFRIGERATOR AND METHOD OF CONTROLLING A REFRIGERATOR

CROSS-REFERENCE TO RELATED APPLICATION(S)

The present application claims priority under 35 U.S.C. 119 and 35 U.S.C. 365 to Korean Patent Application No. 10-2013-0106478, filed in Korea on Sep. 5, 2013, No. 10-2013-0106479, filed in Korea on Sep. 5, 2013, and No. 10-2014-0085253, filed in Korea on Jul. 8, 2014, which are hereby incorporated by reference in their entirety.

BACKGROUND

1. Field

A refrigerator and a method of controlling a refrigerator is disclosed herein.

2. Background

In general, a refrigerator has a plurality of storage compartments to accommodate items to be stored, such as food items, so as to store the items in a frozen or refrigerated state. One surface of the plurality of storage compartments may be opened to accommodate or dispense the items. The plurality of storage compartments may include a freezing compartment to store items in the frozen state, and a refrigerating compartment to store items in the refrigerated state.

A refrigeration system, in which a refrigerant is circulated, is driven in the refrigerator. The refrigeration system may include a compressor, a condenser, an expansion device, and an evaporator. The evaporator may include a first evaporator disposed at a side of the refrigeration compartment, and a second evaporator disposed at a side of the freezing compartment.

Cool air stored in the refrigerating compartment may be cooled while passing through the first evaporator, and the cooled cool air may be supplied again into the refrigerating compartment. Also, the cool air stored in the freezing compartment may be cooled while passing through the second evaporator, and the cooled cool air may be supplied again into the freezing compartment.

As described above, in the refrigerator according to the related art, independent cooling may be performed in the plurality of storage compartments through separate evaporators. In relation to such a refrigerator, this Applicant has registered Korean Patent Registration No. 10-1275184 (Registration Date: Jun. 10, 2013), which is hereby incorporated by reference. According to this prior patent, refrigerant may be selectively supplied into first or second evaporators to cool one storage compartment of the plurality of storage compartments and stop cooling of other storage compartments.

As described above, according to the related art, the plurality of storage compartments may not be cooled at the same time, but rather, may be selectively or alternately cooled. In this case, although the storage compartment in which the cooling is performed is maintained at an adequate temperature, the storage compartment in which the cooling is not performed may increase in temperature, and thus, may be beyond a normal or desired temperature range.

Also, in a state in which cooling of one storage compartment is required, if it is determined that another storage compartment is beyond the normal temperature range, another storage compartment may not be immediately cooled. As a result, in structure in which the plurality of storage compartments are independently cooled, cool air may not be supplied at a suitable time and place, deteriorating operation efficiency of the refrigerator.

The related art refrigerator includes a machine room, in which a portion of components of the refrigeration system is disposed. In detail, the compressor, the condenser, and a condensing fan disposed on or at a side of the condenser to blow air may be disposed in the machine room. Air flowing due to the condensing fan may perform heat exchange (cooling) in the condenser and cool the compressor. Regarding components within the machine room, this Applicant applied for a patent Korean Patent Application No. 10-2008-0122241 (filing date: Dec. 4, 2008), which is hereby incorporated by reference.

Recently, a refrigerator having a relatively large storage compartment may have had a large influence on customer product purchasing. Thus, there is a lot of interest in technology to reduce a volume of the machine room so as to increase in volume the storage compartment.

However, in the refrigerator according to the related art, when the condensing fan is decreased in size to reduce a height of the machine room, it may be difficult to generate a sufficient air flow, thereby deteriorating heat-exchange efficiency of the condenser. Also, when the condensing fan increases in rotation number to generate a sufficient air flow, an inner pressure of the machine room may abnormally increase, causing an increase in noise.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the accompanying drawings. Embodiments may, however, be embodied in many different forms and should not be construed as being limited to the embodiments set forth herein; rather, alternate embodiments included in other retrogressive inventions or falling within the spirit and scope of the present disclosure will fully convey the concept to those skilled in the art.

Figure 1:
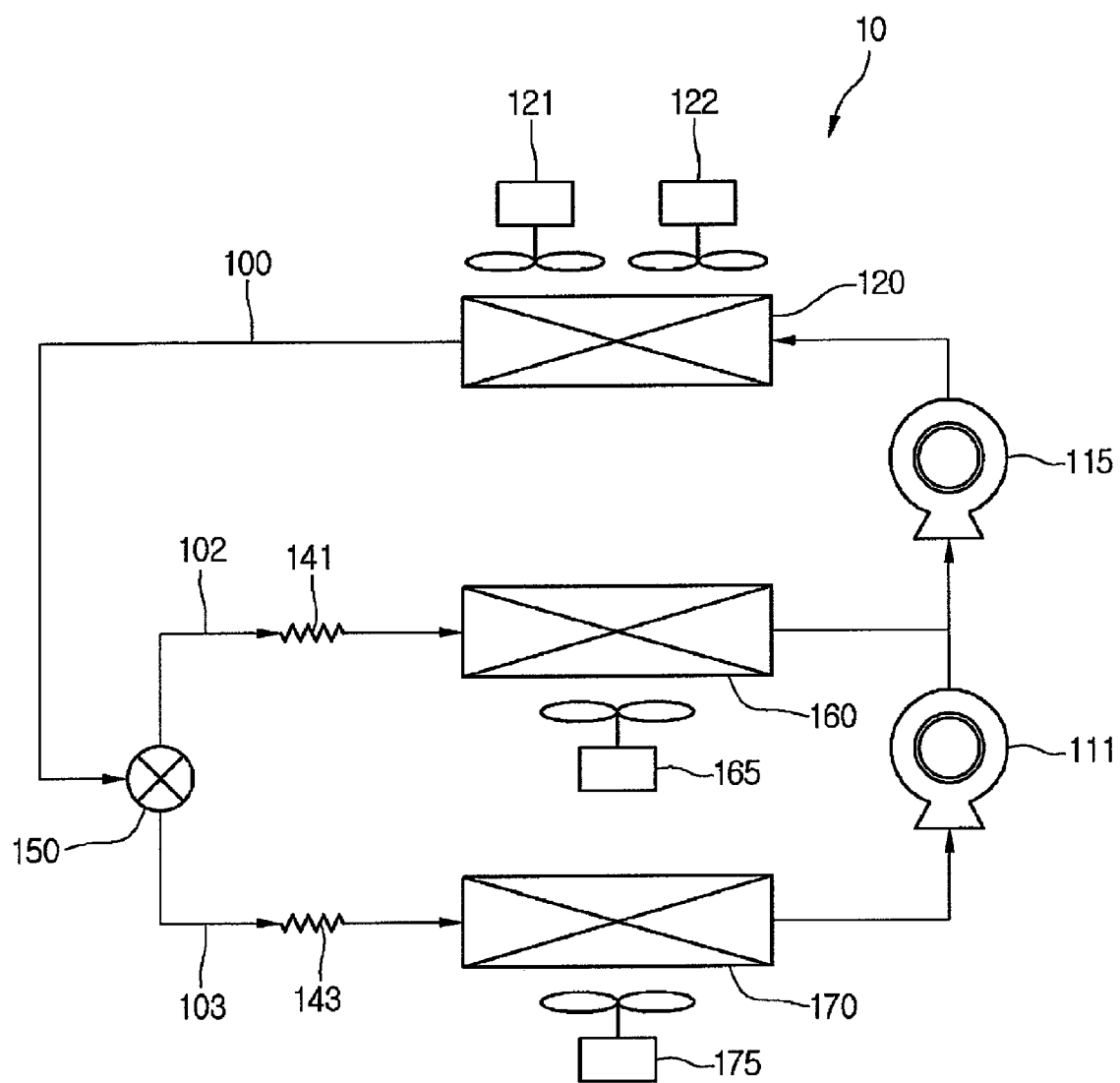
FIG. 1 is a schematic diagram of a refrigerator according to an embodiment.

FIG. 1 is a schematic diagram of a refrigerator according to an embodiment. Referring to FIG. 1, a refrigerator 10 according to this embodiment may include a plurality of devices to drive a refrigeration cycle.

In detail, the refrigerator 10 may include a plurality of compressors 111 and 115 to compress a refrigerant, a condenser 120 to condense the refrigerant compressed in the plurality of compressors 111 and 115, a plurality of expansion devices 141 and 143 to decompress the refrigerant condensed in the condenser 120, and a plurality of evaporators 160 and 170 to evaporate the refrigerant decompressed in the plurality of expansion devices 141 and 143. The refrigerator 10 may further include a refrigerant tube 100 that connects the plurality of compressors 111 and 115, the condenser 120, the expansion devices 141 and 143, and the evaporators 160 and 170 to each other to guide a flow of the refrigerant.

The plurality of compressors 111 and 115 may include a first compressor 111 disposed at a low-pressure side to primarily compress the refrigerant, and a second compressor 115 to additionally compress the refrigerant compressed in the first compressor 111. The first compressor 111 and the second compressor 115 may be connected to each other in series. That is, an outlet-side refrigerant tube of the first compressor 111 may be connected to an inlet-side of the second compressor 115.

The plurality of evaporators 160 and 170 may include a first evaporator 160 to generate cool air to be supplied into one storage compartment of a refrigerating compartment and a freezing compartment, and a second evaporator 170 to generate cool air to be supplied into the other storage compartment. For example, the first evaporator 160 may generate cold air to be supplied into the refrigerating compartment, and may be disposed on or at one side of the refrigerating compartment. The second evaporator 170 may generate cold air to be supplied into the freezing compartment, and may be disposed on or at one side of the freezing compartment.

The cool air to be supplied into the freezing compartment may have a temperature less than a temperature of the cool air to be supplied into the refrigerating compartment. Thus, a refrigerant evaporation pressure of the second evaporator 170 may be less than a refrigerant evaporation pressure of the first evaporator 160.

An outlet-side refrigerant tube 100 of the second evaporator 170 may extend to an inlet-side of the first compressor 111. Thus, the refrigerant passing through the second evaporator 170 may be introduced into the first compressor 111. The outlet-side refrigerant tube 100 of the first evaporator 160 may be connected to the outlet-side refrigerant tube of the first compressor 111. Thus, the refrigerant passing through the first evaporator 160 may be mixed with the refrigerant compressed in the first compressor 111, and then, the mixture may be suctioned into the second compressor 115.

The plurality of expansion devices 141 and 143 may include a first expansion device 141 to expand the refrigerant to be introduced into the first evaporator 160, and a second expansion device 170 to expand the refrigerant to be introduced into the second evaporator 170. Each of the first and second expansion devices 141 and 143 may include a capillary tube. A capillary tube of the second expansion device 143 may have a diameter less than a diameter of the capillary tube of the first expansion device 141, so that a refrigerant evaporation pressure of the second evaporator 170 is less than a refrigerant evaporation pressure of the first evaporator 160.

A first refrigerant passage 102 to guide introduction of the refrigerant into the first evaporator 160 may be defined in or at an inlet-side of the first evaporator 160. The first expansion device 141 may be disposed in the first refrigerant passage 102. The first refrigerant passage 102 may be referred to as a "first evaporation passage" in that the first refrigerant passage 102 guides the introduction of the refrigerant into the first evaporator 160.

A second refrigerant passage 103 to guide introduction of the refrigerant into the second evaporator 170 may be defined in or at an inlet-side of the second evaporator 170. The second expansion device 143 may be disposed in the second refrigerant passage 103. The second refrigerant passage 103 may be referred to as a "second evaporation passage" in that the second refrigerant passage 103 guides the introduction of the refrigerant into the second evaporator 170. The first and second refrigerant passages 102 and 103 may be understood as "branch passages" that are branched from the refrigerant tube 100.

The refrigerator 10 may further include a flow adjuster 150 to branch and introduce the refrigerant into the first and second refrigerant passages 102 and 103. The flow adjuster 150 may be understood as a device to simultaneously or alternately operate the first and second evaporators 150 and 160, that is, to adjust a flow of the refrigerant so that the refrigerant is simultaneously or alternately introduced into the first and second evaporators 160 and 170. The flow adjuster 150 may include a three-way valve having an inflow, through which the refrigerant may be introduced, and two discharges, through which the refrigerant may be discharged.

The first and second refrigerant passages 102 and 103 may be connected to the two discharges of the flow adjuster 150. Thus, the refrigerant passing through the flow adjuster 150 may be branched and discharged into the first and second refrigerant passages 102 and 103. The discharges connected to the first and second refrigerant passages 102 and 103 may be referred to as a "first discharge" and a "second discharge", respectively.

The refrigerator 10 may also include a first evaporation fan 165 disposed or at on one side of the first evaporator 160, and a second evaporation fan 175 disposed on or at one side of the second evaporator 170. Heat-exchange performance of the first and second evaporators 160 and 170 may vary according to rotation rates of the first and second evaporation fans 155 and 165.

The refrigerator 10 may further include a plurality of condensing fans 121 and 122 disposed on or at one side of the condenser 120 to generate an air flow. The plurality of condensing fans 121 and 122 may be disposed substantially in parallel to each other and be configured to allow air to flow from outside into the condenser 120.

The first and second compressors 111 and 115, the condenser 120, and the plurality of condensing fans 121 and 122 may be disposed in a machine room of the refrigerator 10. For example, the machine room may be defined in a rear lower portion of a main body of the refrigerator 10, in which a storage compartment may be defined. Hereinafter, the machine room will be described with reference to the accompanying drawings.

Figure 2:
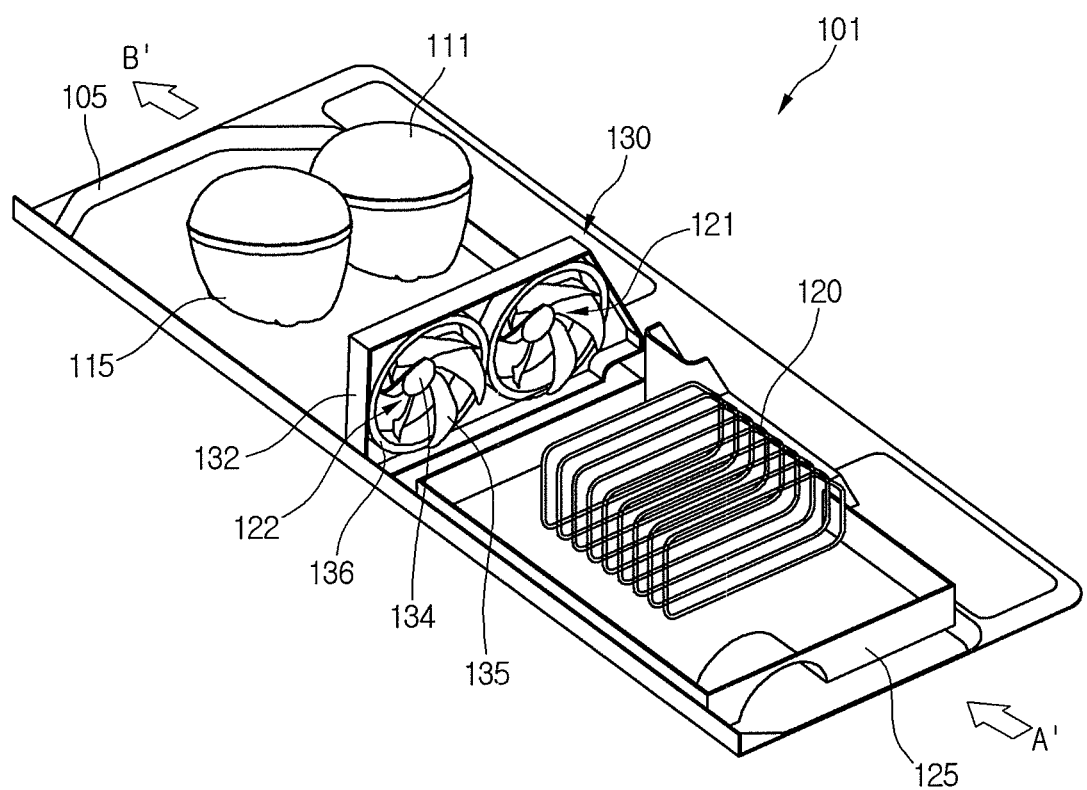
FIG. 2 is a perspective view of a machine room of a refrigerator according to an embodiment.
Figure 3:
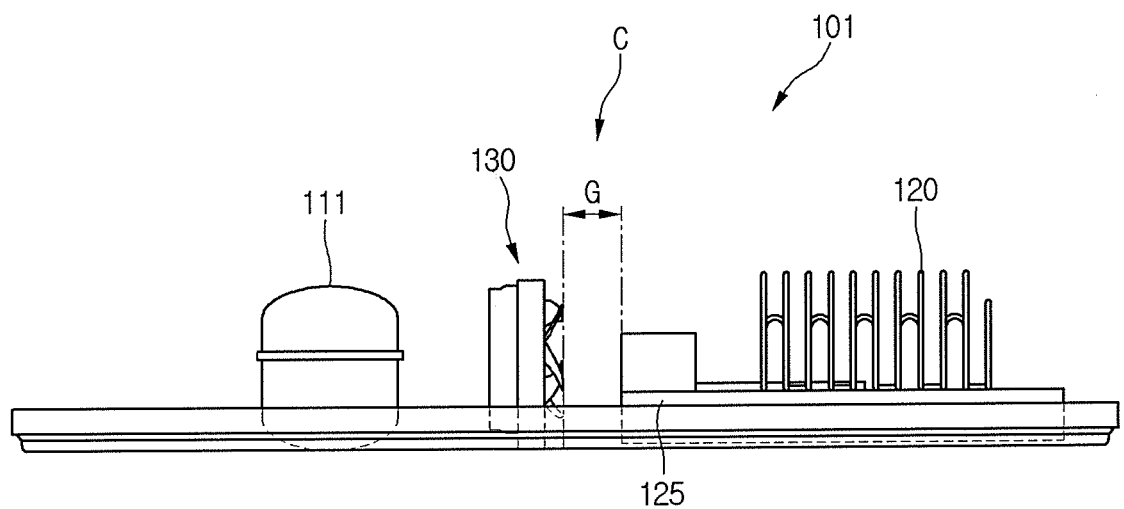
FIG. 3 is a front view of the machine room of FIG. 2.

FIG. 2 is a perspective view of a machine room of a refrigerator according to an embodiment. FIG. 3 is a front view of the machine room of FIG. 2.

Referring to FIG. 2, a base 105 that defines a bottom surface of the machine room 101, the plurality of compressors 111 and 115 seated on the base 105, the condenser 120 to condense the refrigerator compressed in the plurality of compressors 111 and 115, and a fan assembly 130 to generate an air flow toward the condenser 120 may be disposed in the machine room 101 according to this embodiment. The plurality of compressors 111 and 115 and the condenser 120 may both be disposed adjacent the fan assembly 130. That is, the fan assembly 130 may be disposed between the plurality of compressors 111 and 115 and the condenser 120.

The fan assembly 130 may be disposed on the base 105. That is, a bottom surface of the fan assembly 130 may be coupled to a top surface of the base 105, and the fan assembly 130 may extend in an upward direction from the base 105.

A drain pan 125, in which condensed water generated in the condenser 120 may be stored, may be further disposed on the base 105. The drain pan 125 may be disposed under the condenser 120, and a lower portion of the condenser 120 may be accommodated into the drain pan 125. The fan assembly 130 may be disposed outside of or adjacent to the drain pan 125.

Thus, as the fan assembly 130 may be disposed outside of or adjacent to the drain pan 125 and extend in an upward direction from the base 105, the fan assembly 130 may be reduced in installation height in comparison to a case in which the fan assembly is disposed within the drain pan according to the related art. That is, when compared to the related art, the installation height of the fan assembly 120 may be reduced by a bottom thickness of the drain pan 125. As a result, the machine room 101 accommodating the fan assembly 130 may also be reduced in height.

The drain pan 125 may have sufficient capacity to store condensed water generated from or by the condenser 120. The drain pan 125 may have an approximately hexahedral shape with an open top surface and a predetermined height to collect the condensed water. Further, the drain pan 125 may have a height less than a height of the fan assembly 130.

Also, when compared to the drain pan of the related art (see FIG. 2, reference numeral is not given, of Application No. KR 10-2008-0122241), the drain pan 125 according to this embodiment may decrease in width in a horizontal direction and increase somewhat in depth in a front to rear direction. The horizontal direction and the front to rear direction may be understood as a horizontal direction and front to rear direction when viewed from a front side of the refrigerator. These directions may be equally applied to the following descriptions.

As the width of the drain pan 125 in the horizontal direction is reduced when compared to the related art, the fan assembly 130 may be disposed outside of or adjacent to the drain pan 125 within the machine room having limited volume.

The fan assembly 130 may include the plurality of condensing fans 121 and 122. The plurality of condensing fans 121 and 122 may include first and second condensing fans 121 and 122, which may be disposed substantially in parallel to each other. That is, the second condensing fan 122 may be disposed on or at a side of the first condensing fan 121. Thus, air suctioned into the fan assembly 130 may pass through each of the first and second condensing fans 121 and 122, and then, may be discharged.

Further, the first condensing fan 121 may be disposed to correspond to the first compressor 111, and the second condensing fan 122 may be disposed to correspond to the second compressor 115. That is, the first compressor 111 and the first condensing fan 121 may form one row (a first row), and the second compressor 115 and the second condensing fan 122 form another row (a second row). The first row may be disposed on or at a front side of the second row.

A width of the fan assembly 130 in the front to rear direction may be equal to or greater than a width of the condenser 120 in the front to rear direction. That is, a front end of the fan assembly 130 may be disposed on a same line as a front end of the condenser 120, or disposed at a front side of the front end of the condenser 120. Also, a rear end of the fan assembly 130 may be disposed on a same line as a rear end of the condenser 120, or disposed at a rear side of the rear end of the condenser 120. Thus, as an air flow region due to operation of the fan assembly 130 covers a whole region of the condenser 120, heat-exchange performance of the condenser 120 may be improved.

Each of the first and second condensing fans 121 and 122 may include a hub 134 that defines a central portion of the fan, a plurality of blades 135 that extends from the hub 134 in a radial direction, and a shroud 136 disposed outside ends of the plurality of blades 135 to guide suction and discharge of the air through the plurality of blades 135. The shroud 136 of the first condensing fan 121 and the shroud 136 of the second condensing fan 122 may be coupled to each other. That is, an outer circumferential surface of the shroud 136 of the first condensing fan 121 may be coupled to and contact the shroud 136 of the second condensing fan 122.

The fan assembly 130 may further include a housing 132 that surrounds the first and second condensing fans 121 and 122. The housing 132 may be coupled to the top surface of the base 105. The housing 132 may surround the shroud 136 of the first condensing fan 121 and the shroud 136 of the second condensing fan 140.

Air flow within the machine room 101 will now be described hereinbelow.

When the first and second condensing fans 121 and 122 operate, external air of the refrigerator may be suctioned into the machine room 101 (in a direction A' in FIG. 2). The refrigerator 10 may include a cover member (not shown) that covers the machine room 101. A suction hole, through which air may be introduced into the machine room 101, may be defined in the cover member. For example, the suction hole may be provided as a plurality suction holes in a side and rear side of the machine room 101.

The air suctioned into the machine room 101 may cool the condenser 120 while passing through the condenser 120. A refrigerant having a temperature greater than a temperature of the air may flow into the condenser 120.

The air passing through the condenser 120 may pass through the first and second condensing fans 121 and 122 to flow into to first and second compressors 111 and 115. The first and second compressors 111 and 115 may compress the refrigerator to a high temperature. Thus, the first and second compressors 111 and 115 may generate a large amount of heat. The air flowing into the machine room 101 may cool the first and second compressors 111 and 115.

The air passing through or by the first and second compressors 111 and 115 may be discharged outside of the machine room 101 (in a direction B' in FIG. 2). A discharge hole to discharge the air within the machine room 101 to the outside may be defined in the cover member. For example, the discharge hole may be provided as a plurality of discharge holes in a side and rear side of the machine room 101.

Referring to FIG. 3, the fan assembly 130 may be spaced a predetermined distance G from the drain pan 125. When the fan assembly 130 is coupled or closely attached to the drain pan 125, at least a portion of the fan assembly 130 may be covered by the drain pan 125. Thus, air flow may be restricted. In this embodiment, this limitation may be prevented.

Also, if the fan assembly 130 is not sufficiently spaced from the drain pan 125 by the predetermined distance, an eddy current may be generated in a space between the fan assembly 130 and the drain pan 125, reducing an amount of air and generating noise. Thus, to solve this limitation, this embodiment provides a predetermined distance value G between the fan assembly 130 and the drain pan 125.

Further, detailed description will be provided hereinbelow with reference to drawings.

Figure 4:
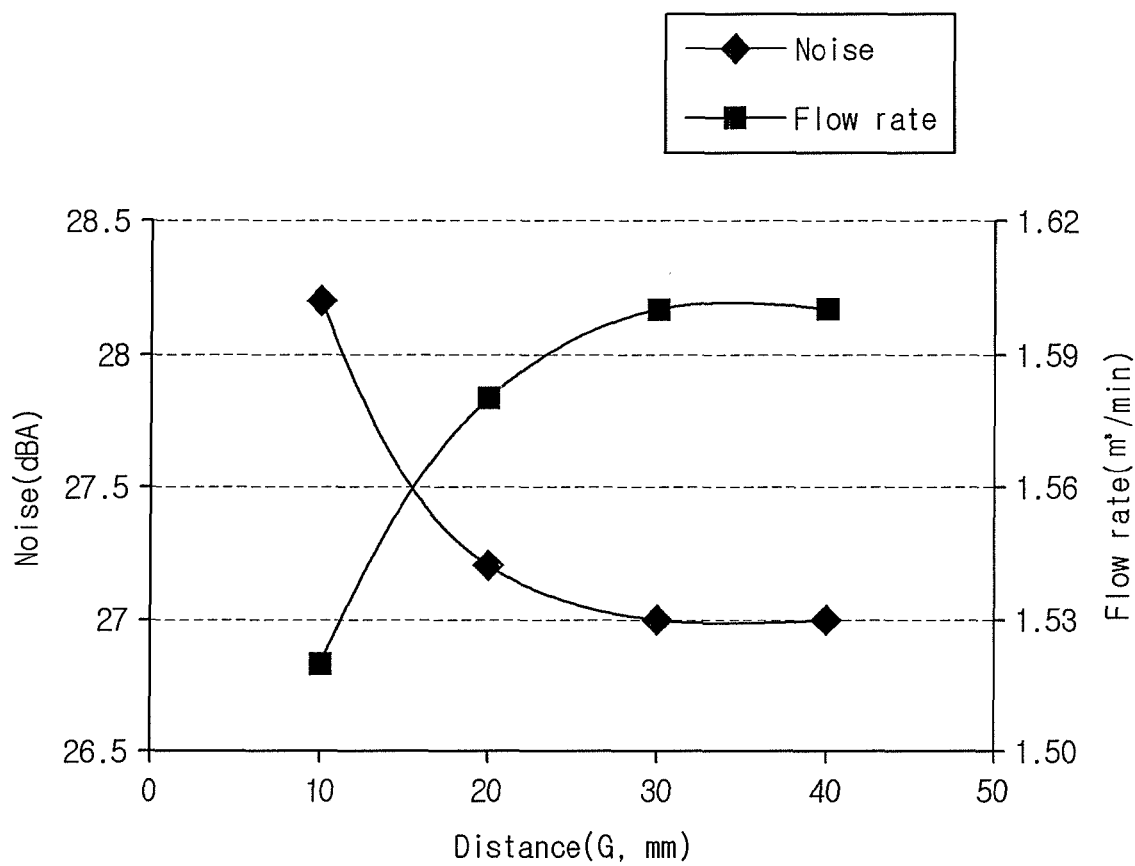
FIG. 4 is a graph illustrating variation in noise and flow rate depending on a distance between a condensing fan and a drain pan according to embodiments.

FIG. 4 is a graph illustrating variation in noise and flow rate depending on a distance between a condensing fan and a drain pan according to embodiments. As described above, the fan assembly 130 and the drain pan 125 may be spaced the predetermined distance G from each other. For example, the predetermined distance G may range from about 20 mm to about 40 mm.

An eddy current may be generated through or in a space C spaced between the fan assembly 130 and the drain pan 125. The eddy current may be understood as a rotating air flow in the space. The eddy current may reduce the amount of air and act as a noise source.

Thus, it may be important to determine the distance G to reduce the occurrence of the eddy current. For example, if the distance G is too short, the occurrence of the eddy current may increase. On the other hand, if the distance G is too long, unnecessary space may be included, and thus, the machine room 101 may increase in volume unnecessarily.

Referring to FIG. 4, a flow noise (dBA) and an air flow rate ($m^3$/min) may vary according to a variation of the distance G (mm), and this may be corroborated by experiment. For example, when the distance G is about 10 mm, the flow noise may be about 28.2 dBA, and the air flow rate may be about 1.52 $m^3$/min. When the distance G is about 20 mm, the flow noise may be about 27.2 dBA, and the air flow rate may be about 1.58 $m^3$/min. That is, it is seen that the more the distance G increases within a range of about 10 mm to about 20 mm, the more the flow noise decreases, and the air flow rate increases.

When the distance G is about 30 mm, the flow noise may be about 27 dBA, and the air flow rate may be about 1.60 $m^3$/min. Also, when the distance G is about 40 mm, the flow noise may be about 27 dBA, and the air flow rate may be about 1.60 $m^3$/min. This may be substantially equal to when the distance G is about 30 mm.

In summary, it is seen that the more the distance G increases within a range of about 20 mm to about 30 mm, the more the flow noise decreases, and the air flow rate increases. However, a decreasing inclination of the flow noise, and an increasing inclination of the air flow rate may be less than those when the distance G ranges from about 10 mm to about 20 mm. Also, it is seen that when the distance G increases within a range of about 30 mm to about 40 mm, the flow noise and air flow rate are maintained constant.

That is, when the distance G is about 20 mm or more, a desired amount of air may be secured, and noise may be reduced. On the other hand, when the distance G is too long, space utilization of the machine room 101 may be deteriorated. Thus, when the distance G is maintained at a distance of about 40 mm or less, the amount of air and the desired noise performance may be achieved, and space utilization of the machine room may be improved. For example, the distance G may be determined to be a distance of about 20 mm to about 30 mm.

Figure 5:
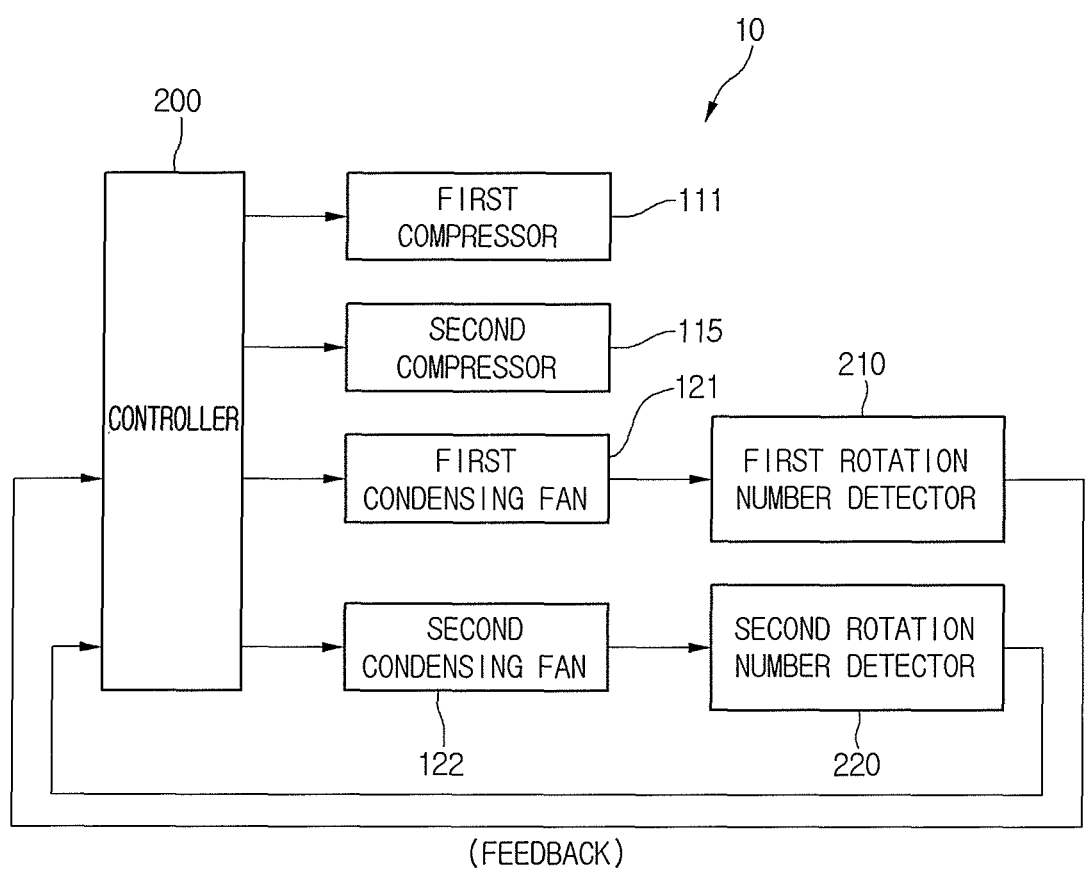
FIG. 5 is a block diagram of a refrigerator according to an embodiment.
Figure 6:
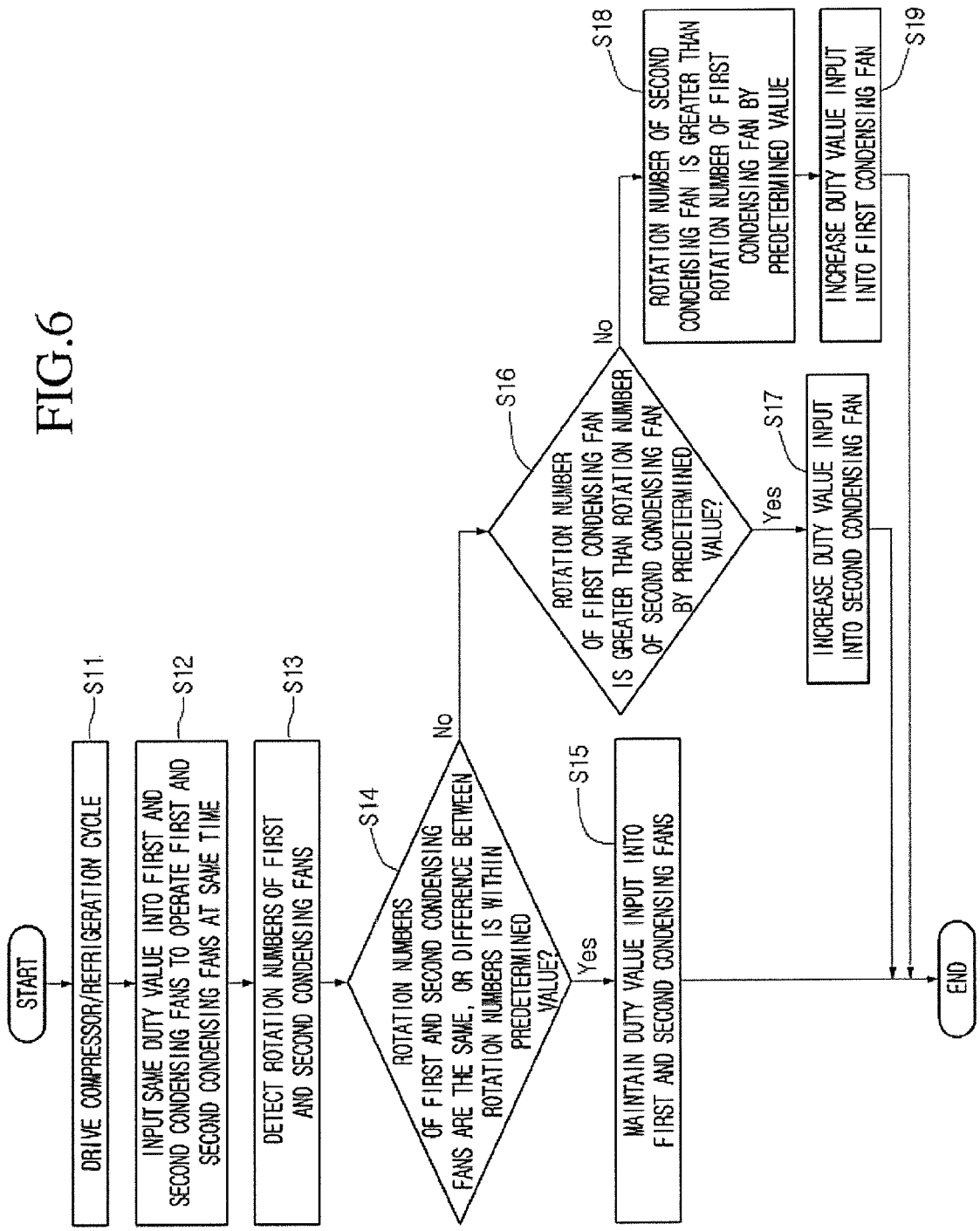
FIG. 6 is a flowchart illustrating a method of controlling a refrigerator according to an embodiment.

FIG. 5 is a block diagram of the refrigerator according to an embodiment. FIG. 6 is a flowchart illustrating a method of controlling a refrigerator according to an embodiment.

Referring to FIGS. 5 and 6, refrigerator 10 according to this embodiment may include the plurality of compressors 111 and 115, the plurality of condensing fans 121 and 122, and a controller 200 that controls the plurality of compressors 111 and 115 and the plurality of condensing fans 121 and 122. The plurality of compressors 111 and 115 may include first compressor 111 and second compressor 115. The plurality of condensing fans 121 and 122 may include first condensing fan 121 and second condensing fan 122.

The first and second condensing fans 121 and 122 may be controlled by a pulse, that is, an electrical signal. The controller 200 may control a duty value that defines a pulse value applied to the first and second condensing fans 121 and 122 to rotate the first and second condensing fans 121 and 122. For example, the more the duty value increases, the more the pulse value may increase. Thus, a rotation number, that is, a rotation rate, of the condensing fan may increase.

Also, the controller 200 may drive the first and second condensing fans 121 and 122 at a same time. That is, the first and second condensing fans 121 and 122 may be turned on and off at the same time.

If the first and second condensing fans 121 and 122 are alternately driven, a backflow may occur around the first and second condensing fans 121 and 122. For example, when the first condensing fan 121 operates, and the second condensing fan 122 does not operate, at least a portion of the air suctioned into the first condensing fan 121 may flow in a reverse direction through the second condensing fan 122, that is, a backflow may occur. When the backflow occurs, air flow efficiency may be deteriorated and an occurrence of noise may increase.

Thus, in this embodiment, the first and second condensing fans 121 and 122 may operate at the same time to prevent the backflow from occurring. Also, the controller 200 may control the first and second condensing fans 121 and 122 so that the rotation number of the first condensing fan 121 and the rotation number of the second condensing fan 122 accord or correspond to each other.

Theoretically, when the same duty value is input into the first and second condensing fans 121 and 122, rotation numbers or rates (RPMs) of the first and second condensing fans 121 and 122 may be the same. Alternatively, the rotation numbers of the first and second condensing fans 121 and 122 may be different according to an inner structure of the machine room 101, or a structure of a space in which the refrigerator 10 is disposed. For example, the inner space of the machine room 101, if an air passage passing through the first condensing fan 121 and an air passage passing through the second condensing fan 122 are different in size, rotation numbers of the plurality of condensing fans may be different from each other.

If the refrigerator 10 is disposed adjacent to a sidewall of the installation space thereof, an amount of air introduced into the machine room through a first suction hole defined adjacent to the sidewall may be relatively less. On the other hand, an amount of air introduced through a second suction hole spaced apart from the sidewall may be relatively large. Also, when the first condensing fan 121 is closer to the first suction hole than the second condensing fan 122, the rotation number of the first condensing fan 121 may be less than the rotation number of the second condensing fan 122.

Thus, the controller 200 may detect the rotation numbers of the first and second condensing fans 121 and 122 to control the first and second condensing fans 121 and 122, so that the rotation numbers of the first and second condensing fans 121 and 122 accord or correspond to each other if the rotation numbers of the first and second condensing fans 121 and 122 are different from each other.

For this, the refrigerator 10 may further include a first rotation number detector 210 to detect a rotation number or rate of the first condensing fan 121, and a second rotation number detector 220 to detect a rotation number or rate of the second condensing fan 122. The controller 200 may input a duty value to apply a predetermined pulse into each of the first and second condensing fans 121 and 122. Then, the controller 200 may feedback information with respect to the rotation numbers or rates that are recognized from the first and second rotation number detectors 210 and 220 to maintain or change the duty value.

Hereinafter, a method of controlling a refrigerator according to an embodiment will be described.

Referring to FIG. 6, first and second compressors 111 and 115 may operate to drive a refrigeration cycle, in step S11. When the refrigeration cycle is driven, first and second condensing fans 121 and 122 may operate. A controller 200 may input a same duty value into the first and second condensing fans 121 and 122 to control a pulse value to control each of the first and second condensing fans 121 and 122. Thus, a predetermined pulse value may be applied into each of the first and second condensing fans 121 and 122 at a same time, in step S12.

While the first and second condensing fans 121 and 122 operate, rotation numbers or rates of the first and second condensing fans 121 and 122 may be detected by first and second rotation number detectors 210 and 220, respectively, in step S13. The controller 200 may maintain or change the duty value input into the first and second condensing fans 121 and 122 on the basis of the rotation numbers.

In detail, it is recognized whether the rotation numbers of the first and second condensing fans 121 and 122 are equal to each other, or a different value between the rotation numbers is within a predetermined value, in step S14. The value may be determined to be a value at which a possibility of occurrence of noise is less, even though the rotation numbers are different from each other, in step S14.

If the rotation numbers of the first and second condensing fans 121 and 122 are equal to each other, or the different value between the rotation numbers is within the predetermined value, a desired performance may be output. Thus, the input duty value may be maintained, in step S15.

On the other hand, in step S14, when the different value between the rotation number of the first condensing fan 121 and the rotation number of the second condensing fan 122 is above the predetermined value, the duty value input in step S12 may be changed. For example, if the rotation number of the first condensing fan 121 is greater by the predetermined value or more than that of the second condensing fan 122, the duty value input into the second condensing fan 122 may increase. When the duty value input into the second condensing fan 122 increases, the rotation number of the second condensing fan 122 may increase to correspond to the increasing duty value, in steps S16, S17.

On the other hand, if the rotation number of the second condensing fan 122 is greater by the predetermined value or more than that of the first condensing value 121, the duty value input into the first condensing fan 121 may increase. When the duty value input into the first condensing fan 121 increases, the rotation number of the first condensing fan 121 may increase to correspond to the increasing duty value, in steps S18, S19.

The control method according to steps S12 to S19 may be repeatedly performed under the operation of the first and second condensing fans 121 and 122. For example, the method in which the rotation numbers of the first and second condensing fans 121 and 122 are detected to control the duty value input into each of the first and second condensing fans 121 and 122 may be performed in real-time.

As described above, as the first and second condensing fans 121 and 122 operate at the same time, backflow generated when the first and second condensing fans 121 and 122 alternately operate may be prevented. Also, as the first and second condensing fans 121 and 122 are feedback-controlled, so that the first and second condensing fans 121 and 122 operate at the same rotation number, occurrence of noise generated when the first and second condensing fans 121 and 122, respectively, operate at rotation numbers different from each other may be reduced.

Hereinafter, another embodiment will be discussed. As this embodiment is the same or similar to the previous except for a method of controlling, differences between the embodiments have been described principally, and descriptions of the same or similar parts have been denoted by the same or like reference numerals and repetitive descriptions have been omitted.

Figure 7:
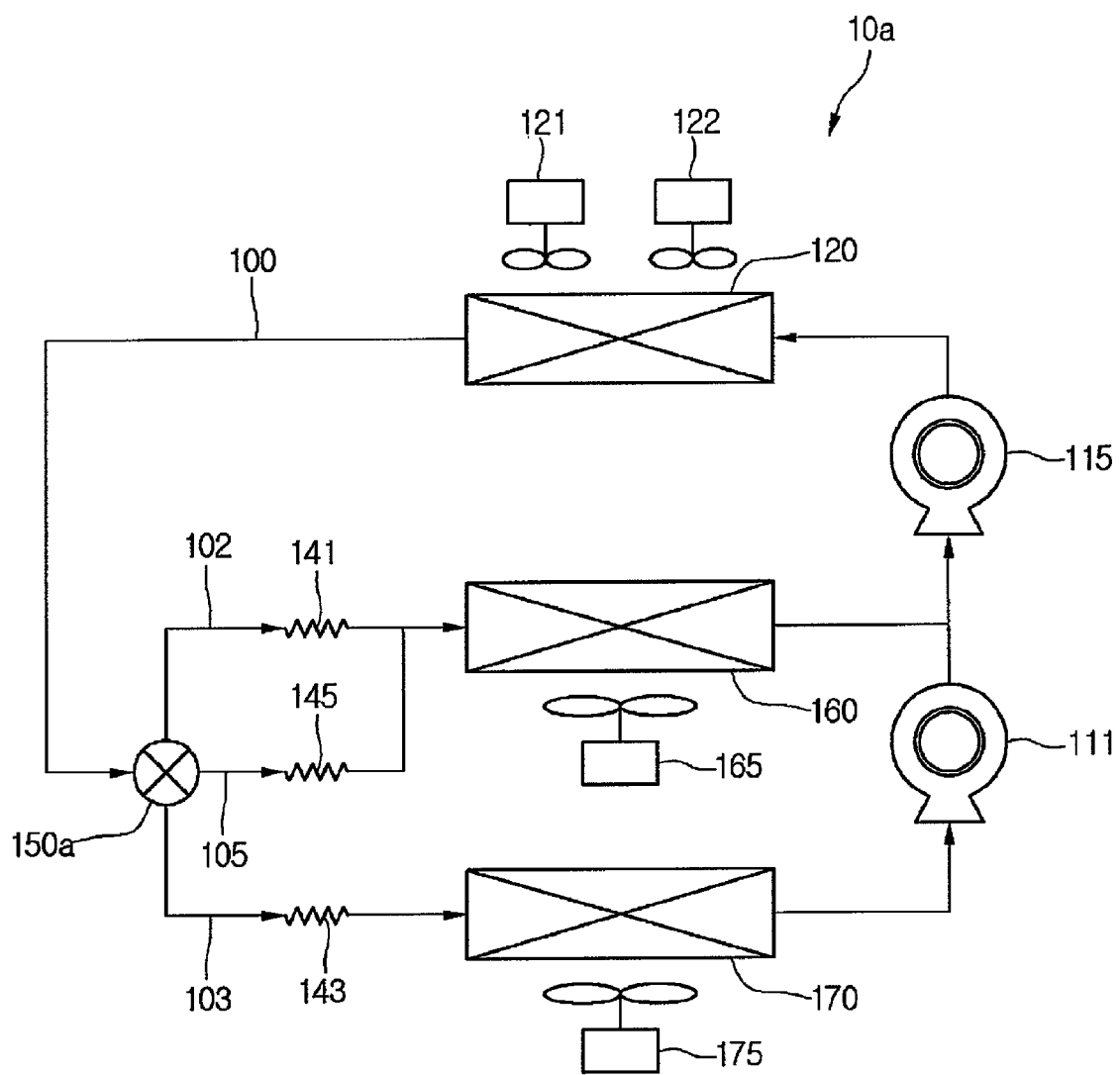
FIG. 7 is a schematic diagram of a refrigerator according to another embodiment.

FIG. 7 is a schematic diagram of a refrigerator according to another embodiment. Referring to FIG. 7, refrigerator 10a according to this embodiment may include a plurality of devices to drive a refrigeration cycle.

In detail, the refrigerator 10a may include a plurality of compressors 111 and 115 to compress a refrigerant, condenser 120 to condense the refrigerant compressed in the plurality of compressors 111 and 115, a plurality of expansion devices 141, 143, and 145 to decompress the refrigerant condensed in the condenser 120, and a plurality of evaporators 160 and 170 to evaporate the refrigerant decompressed in the plurality of expansion devices 141, 143, and 145. The refrigerator 10a may further include refrigerant tube 100 that connects the plurality of compressors 111 and 115, the condenser 120, the expansion devices 141, 143, and 145, and the evaporators 160 and 170 to each other to guide a flow of the refrigerant.

The plurality of compressors 111 and 111 may include first compressor 111 disposed at a low-pressure side, and second compressor 115 to further compress the refrigerant compressed in the first compressor 111. The plurality of evaporators 160 and 170 may include first evaporator 160 to generate cool air to be supplied into one storage compartment of a refrigerating compartment and a freezing compartment, and a second evaporator 170 to generate cool air to be supplied into the other storage compartment. Descriptions with respect to the plurality of compressors 111 and 115 and the plurality of evaporators 160 and 170 will be denoted by those in the previous embodiment.

The plurality of expansion devices 141, 143, and 145 may include first and third expansion devices 141 and 145 to expand the refrigerant to be introduced into the first evaporator 160, and a second expansion device 143 to expand the refrigerant to be introduced into the second evaporator 170. Each of the first to third expansion devices 141, 143, and 145 may include a capillary tube.

For example, the capillary tube of the second expansion device 143 may have a diameter less than a diameter of the capillary tube of each of the first and third expansion devices 141 and 145, so that a refrigerant evaporation pressure of the second evaporator 170 is less than a refrigerant evaporation passage of the first evaporator 160.

A plurality of refrigerant passages 102 and 105 to guide introduction of the refrigerant into the first evaporator 160 may be defined in an inlet-side of the first evaporator 160. The plurality of refrigerant passages 102 and 105 may include a first refrigerant passage 102, in which the first expansion device 141 may be disposed, and a third refrigerant passage 105, in which the third expansion device 145 may be disposed. The first and third refrigerant passages 102 and 105 may be referred to as "first evaporation passages" in that the first and third refrigerant passages 102 and 105 guide the introduction of the refrigerant into the first evaporator 160. The refrigerants flowing into the first and third refrigerant passages 102 and 105 may be mixed with each other, and then, may be introduced into the first evaporator 160.

A refrigerant passage 103 to guide introduction of the refrigerant into the second evaporator 170 may be defined in an inlet-side of the second evaporator 170. The refrigerant passage 103 may include the second refrigerant passage 103, in which the second expansion device 143 is disposed. The second refrigerant passage 103 may be referred to as a "second evaporation passage" in that the second refrigerant passage 103 guides the introduction of the refrigerant into the second evaporator 170.

The first to third refrigerant passages 102, 103, and 105 may be understood as "branch passages" that are branched from the refrigerant tube 100.

The refrigerator 10*a* may further include a flow adjuster 150*a* to branch and introduce the refrigerant into the first to third refrigerant passages 102, 103, and 105. The flow adjuster 150*a* may be understood as a device to operate the first and second evaporators 160 and 170 at a same time, that is, to adjust a flow of the refrigerant so that the refrigerant is introduced into the first and second evaporators 160 and 170 at the same time.

The flow adjuster 150*a* may include a four-way valve having one inflow, through which the refrigerant may be introduced, and three discharges, through which the refrigerant may be discharged. The three discharges of the flow adjuster 150*a* may be connected to the first to third refrigerant passages 102, 103, and 105, respectively. Thus, the refrigerant passing through the flow adjuster 150*a* may be branched and discharged into the first to third refrigerant passages 102, 103, and 105. The discharges connected to the first to third refrigerant passages 102, 103, and 105 may be referred to as a "first discharge", a "second discharge", and a "third discharge" in order.

At least one discharge of the first to third discharges may be opened. When all of the first to third discharges are opened, the refrigerant may flow through the first to third refrigerant passages 102, 103, and 105. On the other hand, when the first and second discharges are opened, and the third discharge is closed, the refrigerant may flow through the first and second refrigerant passages 102 and 103.

As described above, a flow path of the refrigerant may vary according to control of the flow adjuster 150*a*. Also, the control of the flow adjuster 150*a* may be performed on the basis of whether the refrigerant within the first or second evaporator 160 or 170 is excessive or lacking or is concentrated in or to one side.

For example, when the first and second evaporators 160 and 170 operate at the same time, if the refrigerant within the first evaporator 160 is relatively lacking, that is, the refrigerant is concentrated in or to one side, the flow adjuster 150*a* may be controlled so that the refrigerant flows into the first to third refrigerant passages 102, 103, and 105. On the other hand, if the refrigerant within the second evaporator 170 is relatively lacking, that is, concentration of the refrigeration occurs in the first evaporator 160, the refrigerant passage 150*a* may be controlled so that the third refrigerant passage 105 is closed, and the refrigerant flows into the first and second refrigerant passages 102 and 103.

That is, the plurality of flow passages 102 and 105 of the refrigerant to be introduced into the first evaporator 160 may be provided, and flow of the refrigerant may be selectively controlled through the plurality of flow passages 102 and 105 to adjust an amount of refrigerant to be introduced into the first or second evaporator 160 or 170.

As a larger amount of refrigerant flows into the inlet-side of the first evaporator 160 than the inlet-side of the second evaporator 170, when all of the first to third refrigerant passages 102, 103, and 105 are opened, a relatively larger amount of refrigerant may flow into the first evaporator 160 than the second evaporator 170. That is, heat-exchange performance of the first evaporator 160 may be greater than heat-exchange performance of the second evaporator 170. Thus, when the first evaporator 160 corresponds to a refrigerating compartment-side evaporator, and the second evaporator 170 corresponds to a freezing compartment-side evaporator, a cooling load or capacity of the refrigerating compartment may be greater than a cooling load or capacity of the freezing compartment.

The refrigerator 10*a* may further include a plurality condensing fans 121, and 122, and a plurality of evaporation fans 165, and 175 provided on or at one side of the condenser 120, the first evaporator 160, and the second evaporator 170 to blow air. The plurality of condensing fans 121, and 122, and the plurality of evaporation fans 165, and 175 may include a first condensation fan 121 provided on or at one side of the condenser 120, a first evaporation fan 165 provided on or at one side of the first evaporator 160, and a second evaporation fan 175 provided on or at one side of the second evaporator 170.

Heat-exchange performance of the first and second evaporators 160 and 170 may vary according to a rotation number of each of the first and second evaporation fans 165, and 175. For example, if a large amount of refrigerant is required according to operation of the first evaporator 160, the first evaporation fan 165 may increase in rotation number or rate. Also, if cool air is sufficient, the first evaporation fan 165 may be reduced in rotation number.

If a large amount of refrigerant is required according to the operation of the second evaporator 170, the second evaporation fan 175 may increase in rotation number or rate. Also, if cool air is sufficient, the first evaporation fan 175 may be reduced in rotation number.

In detail, if concentration of the refrigerant into the first evaporator 160 occurs, that is, the refrigerant within the second evaporator 170 is relatively lacking, the rotation number of the first evaporation fan 165 may be maintained or increased and the rotation number of the second evaporation fan 175 reduced.

As the rotation number of the first evaporation fan 165 is maintained or increased, a pressure (an evaporation pressure of the first evaporator) of the refrigerant flowing into the first evaporator 160 may be above a proper pressure. Thus, a heat-exchange amount through the first evaporator 160 may be maintained at at least a predetermined amount or more.

On the other hand, as the rotation number of the second evaporation fan 175 is reduced, a pressure (an evaporation pressure of the second evaporator) of the refrigerant flowing into the second evaporator 170 may be below a proper pressure. Thus, a heat-exchange amount through the second evaporator 170 may be maintained at at least a predetermined amount or less.

Thus, as the pressure of the second evaporator 170 is less than the pressure of the first evaporator 160, the refrigerant passing through the flow adjustor 150a may further flow toward the second evaporator 170 due to a pressure difference therebetween. Thus, the refrigerant concentration phenomenon into the first evaporator 160 may be reduced somewhat.

Figure 8:
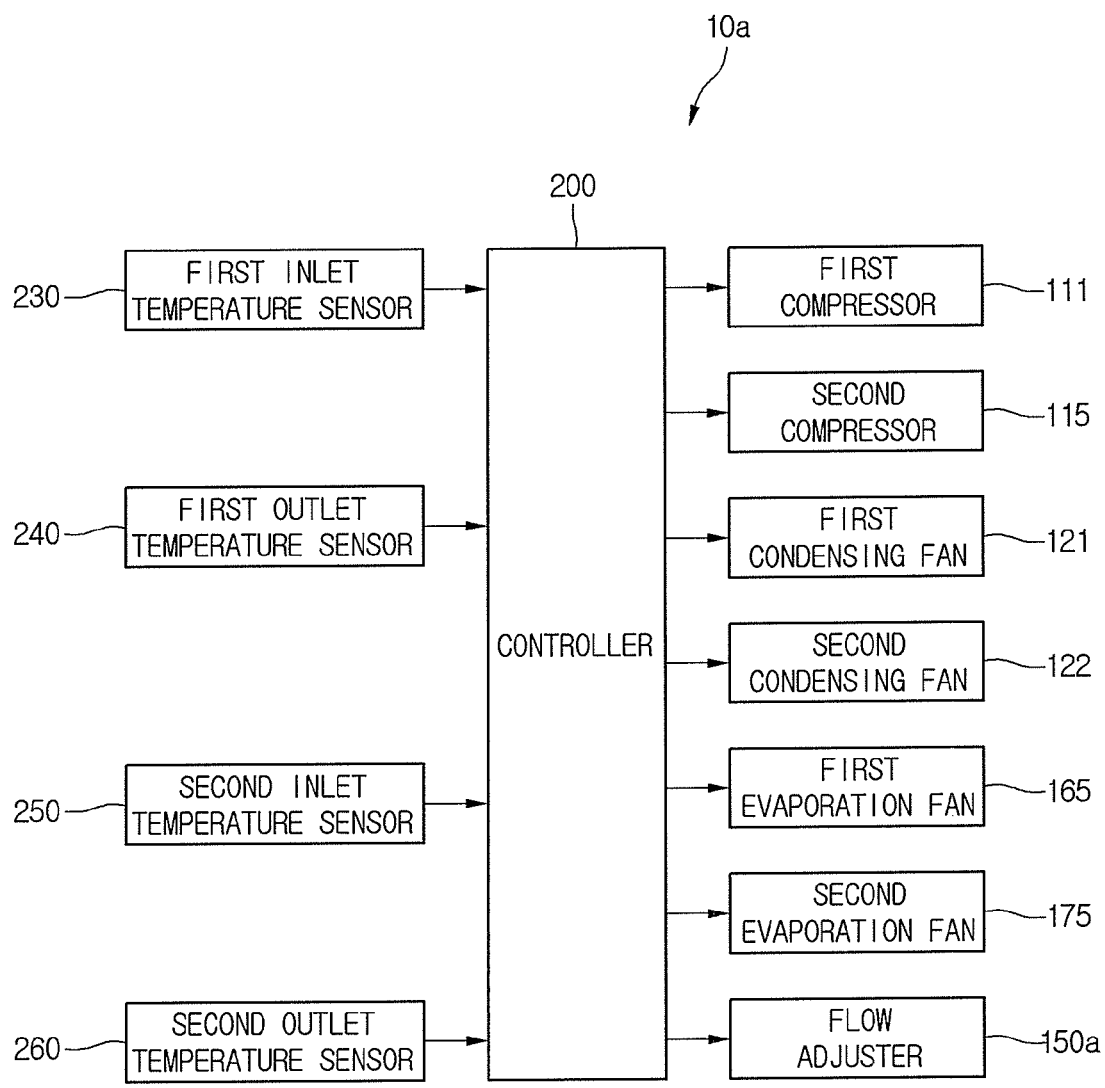
FIG. 8 is a block diagram of a refrigerator according to another embodiment.
Figure 9:
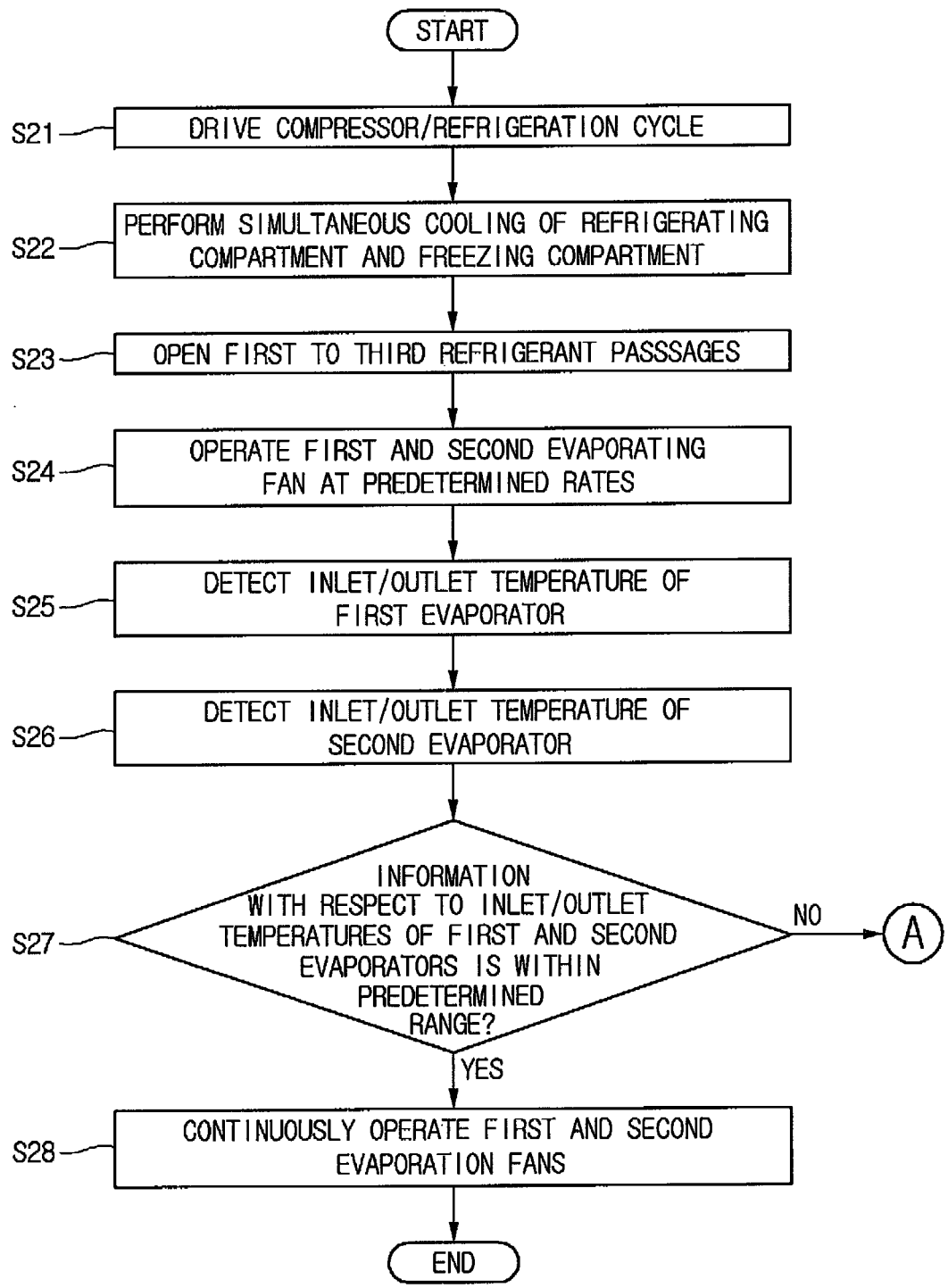
FIGS. 9 and 10 are flowcharts illustrating a method of controlling a refrigerator according to another embodiment.
Figure 10:
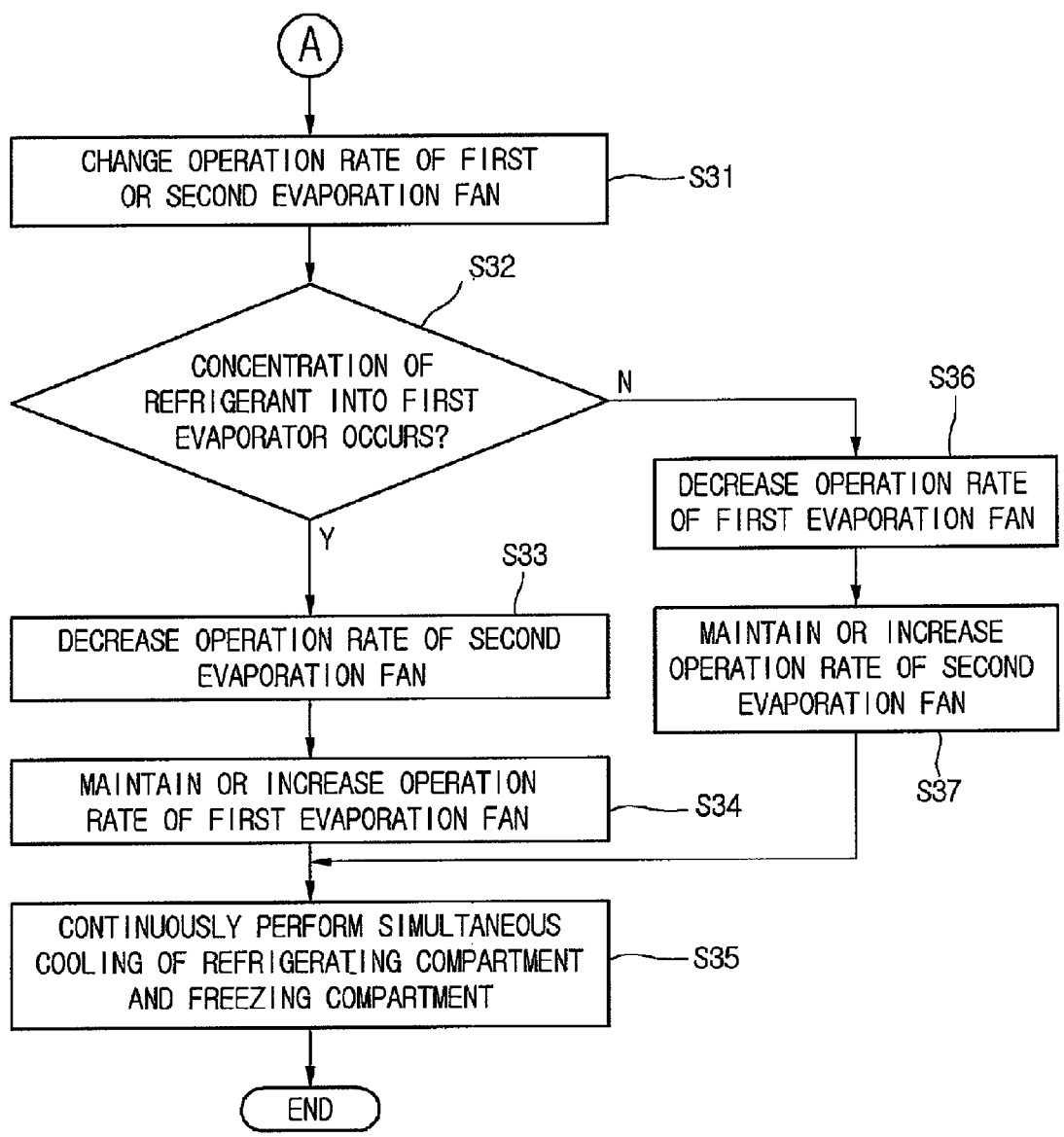

FIG. 8 is a block diagram of a refrigerator according to another embodiment. FIGS. 9 and 10 are flowcharts illustrating a method of controlling a refrigerator according to another embodiment.

Referring to FIG. 8, refrigerator 10a according to this embodiment may include a plurality of temperature sensors 230, 240, 250, and 260 to detect inlet or outlet temperatures of each of first and second evaporators 160 and 170. The plurality of temperature sensors 230, 240, 250, and 260 may include a first inlet temperature sensor 230 to detect an inlet-side temperature of the first evaporator 160, and a first outlet temperature sensor 240 to detect an outlet-side temperature of the first evaporator 160. Also, the plurality of temperature sensors 230, 240, 250, and 260 may include a second inlet temperature sensor 250 to detect an inlet-side temperature of the second evaporator 170, and a second outlet temperature sensor 260 to detect the outlet-side temperature of the second evaporator 170.

The refrigerator 10a may further include controller 200 to control an operation of flow adjuster 150a on the basis of the temperatures detected by the plurality of temperature sensors 230, 240, 250, and 260. To perform cooling operations of the refrigerating and freezing compartments at a same time, the controller 200 may control operations of first and second compressors 111 and 115, first and second condensation fans 121 and 122, and first and second evaporation fans 165 and 175.

A method of controlling the refrigerator according to another embodiment will be described with reference to FIGS. 9 and 10. To drive the refrigerator, the first and second compressor 111 and 115 may operate. A refrigeration cycle through the compression-condensation-expansion-evaporation of the refrigerant may operate according to the driving of the first and second compressors 111 and 115, in step S21. The refrigerant evaporated in the second evaporator 170 may be compressed in the first compressor 111, and the compressed refrigerant may be mixed with the refrigerator evaporated in the first evaporator 160, and then, the mixture may be introduced into the second compressor 115.

Cooling operations of the refrigerating compartment and the freezing compartment may be performed at a same time according to the operation of the refrigeration cycle, in step S22. To perform the cooling operations of the refrigerating compartment and the freezing compartment at the same time, flow adjuster 150a may be controlled to open first to third refrigerant passages 102, 103, and 105, in step S23.

That is, when the first to third refrigerant passages 102, 103, and 105 are opened, the refrigerant may be introduced into the first and second evaporators 160 and 170. Then, the refrigerant may be heat-exchanged in the first and second evaporators 160 and 170 to supply cool air into the refrigerating compartment and the freezing compartment. As a relatively large amount of refrigerant may be provided into the first evaporator 160, an amount of refrigerant heat-exchanged in the first evaporator 160 may be greater than an amount of refrigerant heat-exchanged in the second evaporator 170.

In this embodiment, when the operation of the refrigerator starts, a state in which all of the first to third refrigerant passages 102, 103, and 105 are opened may be described as an initial default. However, alternatively a state in which the first and second refrigerant passages 102 and 103 are opened, and the third refrigerant passage 105 is closed may be set as the initial default.

The first and second evaporation fans 165 and 175 may operate at a predetermined rate to perform the supply of the cool air into the refrigerating compartment and the freezing compartment, in step S24. The predetermined rate (hereinafter, referred to as a "first predetermined rate") of the first evaporation fan 165 may be an approximately middle rate or high rate, and the predetermined rate (hereinafter, referred to a "second predetermined rate") of the second evaporation fan 175 may be a middle rate.

Here, as described step S23, when all of the first to third refrigerant passages 102, 103, and 105 are opened, a relatively larger amount of refrigerant may flow into the first evaporator 160. Thus, the first evaporation fan 165 may operate at a rate higher than that of the second evaporation fan 175.

For example, the high rate of the first or second evaporation fan 165 or 175 may correspond to an input voltage of about 13V and a wind amount of about 0.8 CMM. Also, the middle rate of the first or second evaporation fan 165 or 175 may correspond to an input voltage of about 10V and a wind amount of about 0.5 CMM. A low rate of the first or second evaporation fan 165 or 175 may correspond to an input voltage of about 9V and a wind amount of about 0.4 CMM.

Inlet and outlet temperatures of the first evaporator 160 may be detected by first inlet and outlet temperature sensors 230 and 240, respectively, in step S25. Also, inlet and outlet temperatures of the second evaporator 170 may be detected by the second inlet and outlet temperature sensors 250 and 260, respectively, in step S26.

The controller 200 may determine an inlet/outlet temperature difference valve of the first evaporator 160 and an inlet/outlet temperature difference valve of the second evaporator 170. When an amount of refrigerant introduced into the first or second evaporator 160 or 170 is above an adequate amount, the difference value between the inlet and outlet temperatures of the first or second evaporator 160 and 170 may decrease. On the other hand, when an amount of refrigerant introduced into the first or second evaporator 160 or 170 is below the adequate amount, the difference value between the inlet and outlet temperatures of the first or second evaporator 160 or 170 may increase.

The controller 200 may recognize whether information with respect to the difference value between the inlet and outlet temperatures of the first or second evaporator 160 or 170 is within a predetermined range, in step S27. That is, the controller 200 may recognize whether an amount of refrigerant flowing into the first or second evaporator 160 or 170 is excessive or lacking, that is, whether the refrigerant is concentrated into the first or second evaporator 160 or 170 on the basis of the inlet/outlet temperature difference of the first evaporator 160 and the inlet/outlet temperature difference of the second evaporator 170.

In detail, whether the amount of refrigerant flowing into the first or second evaporator 160 or 170 is excessive or lacking may be determined on the basis of a difference value between the inlet/outlet temperature difference of the first evaporator 160 and the inlet/outlet temperature difference of the second evaporator 170, or a ratio of the inlet/outlet temperature differences of the first and second evaporators 160 and 170.

Hereinafter, a detailed determination method will be described. As an example of the determination method, it may be determined whether the refrigerant is concentrated into or at one side according to whether the inlet/outlet temperature difference of the first evaporator 160 is equal to or greater or less than a predetermined reference valve.

The refrigerant circulated in the refrigeration cycle may be branched to flow into the first and second evaporators 160 and 170 through the flow adjuster 150*a*. Thus, when the inlet/outlet temperature difference of the first evaporator 160 is detected, a rate of the refrigerant passing through the first evaporator 170 may be recognized. A rate of the refrigerant passing through the second evaporator 170 may be recognized on the basis of the rate of the refrigerant passing through the first evaporator 160.

For example, when the inlet/outlet temperature difference of the first evaporator 160 is greater than the predetermined reference value, it may be determined that an amount of refrigerant is lacking. On the other hand, it may be recognized that an amount of refrigerant flowing into the second evaporator 170 is relatively large.

In this embodiment, a method for determining a refrigerant concentration phenomenon using the inlet/outlet temperature difference of the first evaporator 160 will be described. The refrigerant concentration phenomenon may be determined using the inlet/outlet temperature difference of the second evaporator 170.

If the inlet/outlet temperature difference of the first evaporator 160 is equal to the predetermined reference value (a reference temperature), it may be recognized that the refrigerant concentration phenomenon into the first or second evaporator 160 or 170 may not occur. On the other hand, if the inlet/outlet temperature difference of the first evaporator 160 is not equal to the predetermined reference value or is greater or less than the predetermined reference value, it may be recognized that the refrigerant concentration phenomenon into the first or second evaporator 160 or 170 occurs.

In detail, if the inlet/outlet temperature difference of the first evaporator 160 is less than the predetermined reference value, it may be recognized that a relatively larger amount of refrigerant passes through the first evaporator 160. That is, it may be recognized that the refrigerant concentration phenomenon into the first evaporator 160 occurs.

On the other hand, if the inlet/outlet temperature difference of the first evaporator 160 is greater than the predetermined reference value, it may be recognized that a relatively smaller amount of refrigerant passes through the first evaporator 160. That is, it may be recognized that the refrigerant concentration phenomenon into the second evaporator 170 occurs.

As another example of the determination method, it may be determined whether the refrigerant is concentrated into or at one side according to whether a ratio of the inlet/outlet temperature difference of the first evaporator 160 to the inlet/outlet temperature difference of the second evaporator 170 is equal to or is greater or less than a first predetermined valve. For example, the first predetermined value may be 1.

When a ratio of the inlet/outlet temperature difference of the first evaporator 160 to the inlet/outlet temperature difference of the second evaporator 170 is 1, that is, the inlet/outlet temperature differences of the first and second evaporators 160 and 170 are the same, it may be recognized that the refrigerant concentration phenomenon does not occur in the first or second evaporator 160 or 170. On the other hand, when a ratio of the inlet/outlet temperature difference of the first evaporator 160 to the inlet/outlet temperature difference of the second evaporator 170 is greater than 1, that is, the inlet/outlet temperature difference of the first evaporator 160 is greater than that of the second evaporator 170, it may be recognized that the refrigerant concentration phenomenon does not occur in the second evaporator 170. Also, when a ratio of the inlet/outlet temperature difference of the first evaporator 160 to the inlet/outlet temperature difference of the second evaporator 170 is greater than 1, that is, the inlet/outlet temperature difference of the first evaporator 160 is greater than that of the second evaporator 170, it may be recognized that the refrigerant concentration phenomenon does not occur in the second evaporator 170.

As another further example of the determination method, it may be determined whether the refrigerant is concentrated into or at one side according to whether a difference value between the inlet/outlet temperature difference of the first evaporator 160 and the inlet/outlet temperature difference of the second evaporator 170 is equal to a second predetermined value, or is greater or less than the second predetermined value. For example, the second predetermined value may be 0.

When a value obtained by subtracting the inlet/outlet temperature difference of the second evaporator 170 from the inlet/outlet temperature difference of the first evaporator 160 is zero, that is, the inlet/outlet temperature differences of the first and second evaporators 160 and 170 are the same, it may be recognized that the refrigerant concentration phenomenon does not occur in the first or second evaporator 160 or 170. On the other hand, when the value obtained by subtracting the inlet/outlet temperature difference of the second evaporator 170 from the inlet/outlet temperature difference of the first evaporator 160 is greater than 1, that is, the inlet/outlet temperature difference of the first evaporator 160 is greater than that of the second evaporator 170, it may be recognized that the refrigerant concentration phenomenon does not occur in the second evaporator 170. Also, when the value obtained by subtracting the inlet/outlet temperature difference of the second evaporator 170 from the inlet/outlet temperature difference of the first evaporator 160 is less than 0, that is, the inlet/outlet temperature difference of the first evaporator 160 is less than that of the second evaporator 170, it may be recognized that the refrigerant concentration phenomenon does not occur in the first evaporator 160.

If it is recognized that the refrigerant concentration phenomenon into the first or second evaporator 160 and 170 does not occur through one of the above-described three determination methods, the first and second evaporation fans 165 and 175 may continuously operate at first and second predetermined rates, in step S28. On the other hand, if it is recognized that the refrigerant concentration phenomenon occurs in the first or second evaporator 160 or 170, the operation rate of the first or second evaporation fan 165 or 175 may be changed, in step S31.

If the refrigerant concentration phenomenon occurs in the first evaporator 160, the operation rate of the second evaporation fan 175 may decrease. Thus, the second evaporation fan 175 may operate at a rate lower than the second predetermined rate. For example, the second evaporation fan 175 may operate a low rate.

Also, as the operation rate of the first evaporation fan 165 may be maintained or increase, the first evaporation fan 165 may be maintained at the first predetermined rate or operate at a rate higher than the first predetermined rate. For example, the first evaporation fan 165 may operate at the middle or high rate.

When the operation rate of the second evaporation fan 175 decreases, and the operation rate of the first evaporation fan 165 is maintained or increases, the refrigerant passing through the second evaporator 170 may decrease in evaporation pressure, and the refrigerant passing through the first evaporator 160 may be maintained or increase in evaporation pressure. Due to the difference in pressure, the refrigerant passing through the flow adjuster 150a may further flow toward the second evaporator 170 when compared to that of the first evaporator 160. Thus, the refrigerant concentration phenomenon into the first evaporator 160 may be reduced, in steps S32, S33, S34. Also, in addition to the reduced refrigerant concentration phenomenon, the simultaneous cooling operation for the refrigerating compartment and the freezing compartment may be continuously performed, in step S35.

If the refrigerant concentration phenomenon occurs in the second evaporator 170, the operation rate of the first evaporation fan 165 may decrease. Thus, the first evaporation fan 155 may operate at a rate lower than the first predetermined rate. For example, the first evaporation fan 165 may operate at the low rate.

Also, as the operation rate of the second evaporation fan 175 is maintained or increases, the second evaporation fan 175 may be maintained at the second predetermined rate or operate at a rate higher than the second predetermined rate. For example, the second evaporation fan 175 may operate at the middle or high rate.

When the operation rate of the first evaporation fan 165 decreases, and the operation rate of the second evaporation fan 175 is maintained or increases, the refrigerant passing through the first evaporator 160 may decrease in evaporation pressure, and the refrigerant passing through the second evaporator 170 may be maintained or increase in evaporation pressure. Due to the difference in pressure, the refrigerant passing through the flow adjuster 150a may further flow toward the first evaporator 160 when compared to that of the second evaporator 170. Thus, the refrigerant concentration phenomenon into the second evaporator 150 may be reduced, in steps S36, S37.

Hereinafter, another embodiment will be described. This embodiment is characterized in that an operation rate of an evaporation fan and an operation of a flow adjuster may be controlled. The features of this embodiment will be described hereinbelow.

Figure 11:
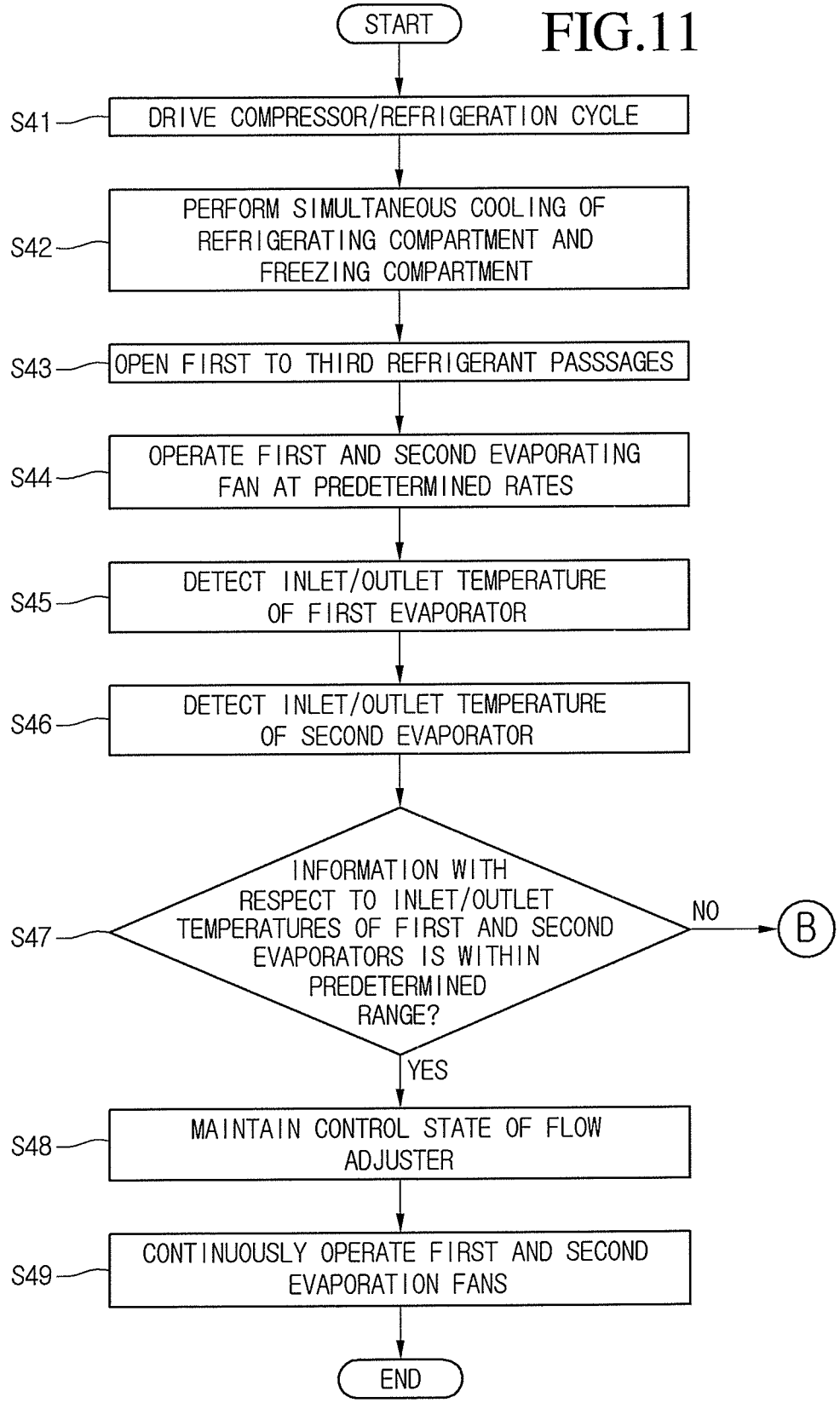
FIGS. 11 and 12 are flowcharts illustrating a method of controlling a refrigerator according to still another embodiment.
Figure 12:
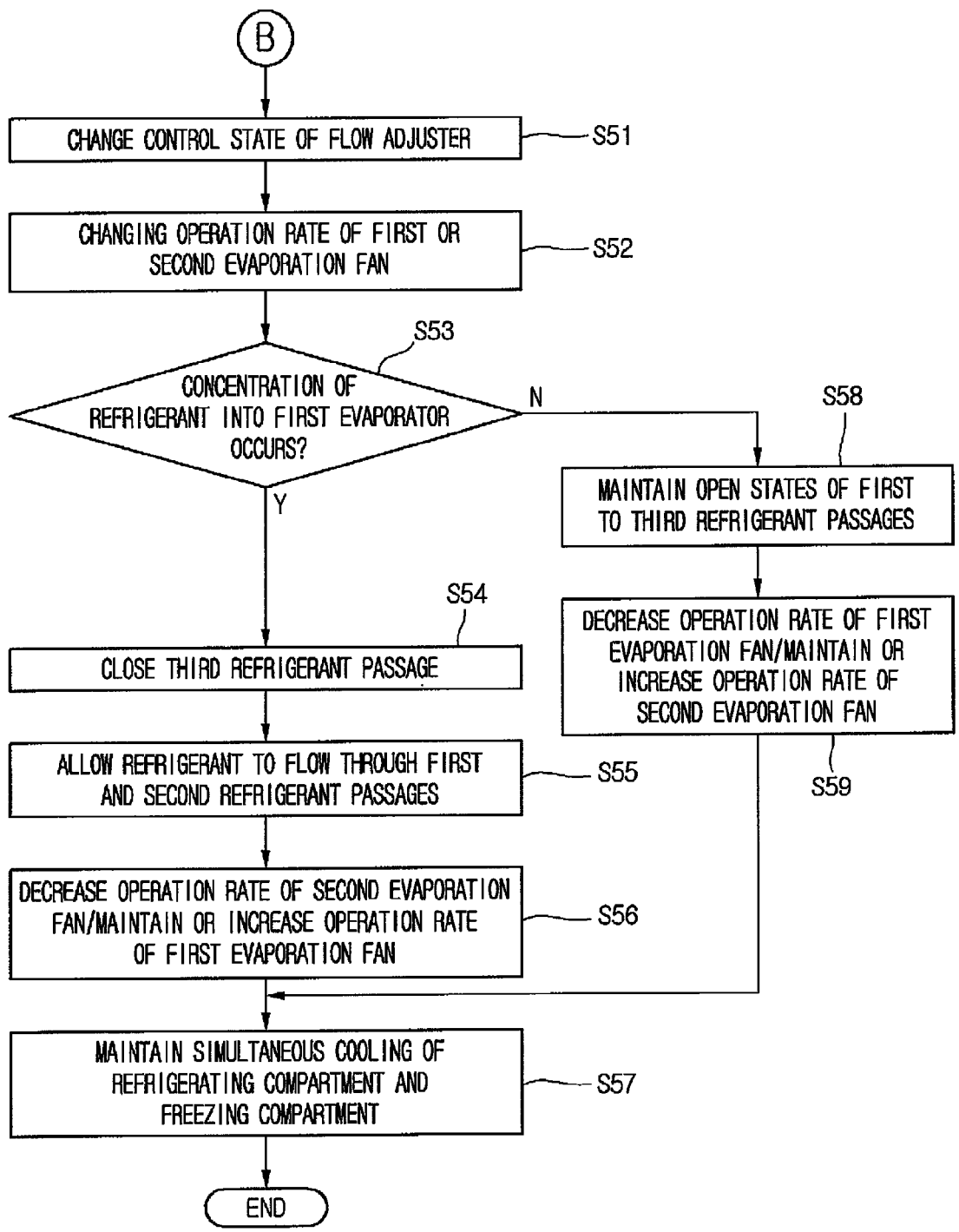

FIGS. 11 and 12 are flowcharts illustrating a method of controlling a refrigerator according to another embodiment. Referring to FIGS. 11 and 12, to operate the refrigerator, first and second compressors 111 and 115 operate to drive a refrigeration cycle, thereby performing an simultaneous cooling operations for a refrigerating compartment and a freezing compartment, in steps S41, S42. To perform the cooling operations of the refrigerating compartment and the freezing compartment at a same time, flow adjuster 150a may be controlled to open first to third refrigerant passages 102, 103, and 105, in step S43.

While performing the simultaneous cooling operations, first and second evaporation fans 165 and 175 may operate at first and second predetermined rates, respectively, in step S44. The second predetermined rate of the second evaporation fan 165 may be an approximately middle rate, and the first predetermined rate of the first evaporation fan 165 may be an approximately middle rate or high rate.

Inlet and outlet temperatures of first evaporator 160 and inlet and outlet temperatures of second evaporator 170 may be detected, in steps S45, S46. The controller 200 may determine an inlet/outlet temperature difference valve of the first evaporator 160 and an inlet/outlet temperature difference valve of the second evaporator 170 to recognize whether information with respect to the inlet/outlet temperature differences of the first and second evaporators 160 and 170 are within a predetermined range. The controller 200 may recognize whether an amount of refrigerant flowing into the first or second evaporator 160 or 170 is excessive or lacking, that is, whether the refrigerant is concentrated into the first or second evaporator 160 or 170 according to whether the information with respect to the inlet/outlet temperature differences of the first and second evaporators 160 and 170 are within the predetermined range.

If the information with respect to the inlet/outlet temperature differences of the first and second evaporators 160 and 170 are with the predetermined range, it may be recognized that the refrigerant concentration phenomenon into the first or second evaporator 160 or 170 may not occur. In this case, a control state of the flow adjuster 150a may be maintained. That is, the flow adjuster 150a may be controlled to open all of the first to third refrigerant passages 102, 103, and 105, in step S48. Also, the first and second evaporation fans 165 and 175 may continuously operate at the first and second predetermined rates, respectively, in step S49.

On the other hand, if it is recognized that the refrigerant concentration phenomenon occurs in the first or second evaporator 160 or 170, a control state of the flow adjuster 150a may be changed, and the first or second evaporation fan 165 or 175 may be changed in operation rate, in steps S51, S52. That is, if the refrigerant concentration phenomenon occurs in the first evaporator 160, the third refrigerant passage 105 may be closed to control a flow of the refrigerant through the first and second refrigerant passages 102 and 103, or the first refrigerant passage 102 may be closed to control a flow of the refrigerant through the second and third refrigerant passages 103 and 105. In this case, an amount of refrigerant introduced into the first evaporator 160 may decrease, and an amount of refrigerant introduced into the second evaporator 170 may increase to solve the refrigerant concentration phenomenon in the first evaporator 160, in steps S53, S54, S55.

Also, as the operation rate of the second evaporation fan 175 decreases, the second evaporation fan 175 may operate at a rate lower than the second predetermined rate, for example, the low rate. Also, as the operation rate of the first evaporation fan 165 is maintained or increases, the first evaporation fan 165 may be maintained at the first predetermined rate or operate at a rate higher than the first predetermined rate. For example, the first evaporation fan 165 may operate at the middle or high rate.

When the operation rate of the second evaporation fan 175 decreases, and the operation rate of the first evaporation fan 165 is maintained or increases, the refrigerant may further flow toward the second evaporator 170 than the first evaporator 160 due to the evaporation pressure difference between the first and second evaporations 160 and 170. Thus, the refrigerant concentration phenomenon into the first evaporator 160 may be reduced, in step S56. Also, in addition to the reduced refrigerant concentration phenomenon, the simultaneous cooling operation for the refrigerating compartment and the freezing compartment may be continuously performed, in step S57.

If the refrigerant concentration phenomenon occurs in the second evaporator 170, the opened states of the first to third refrigerant passages 102, 103, and 105 may be maintained, in step S58. Also, as the operation rate of the first evaporation fan 165 decreases, the first evaporation fan 165 may operate at a rate lower than the first predetermined rate. For example, the first evaporation fan 165 may operate at the low rate. Also, as the operation rate of the second evaporation fan 175 is maintained or increases, the second evaporation fan 175 may be maintained at the second predetermined rate or operate at a rate higher than the second predetermined rate. For example, the second evaporation fan 175 may operate at the middle or high rate.

When the operation rate of the first evaporation fan 165 decreases, and the operation rate of the second evaporation fan 175 is maintained or increases, the refrigerant passing through the flow adjuster 150a may further flow toward the first evaporator 160 than the second evaporator 170 due to the evaporation pressure difference between the first and second evaporations 160 and 170. Thus, the refrigerant concentration phenomenon into the second evaporator 170 may be reduced, in step S59.

Figure 13:
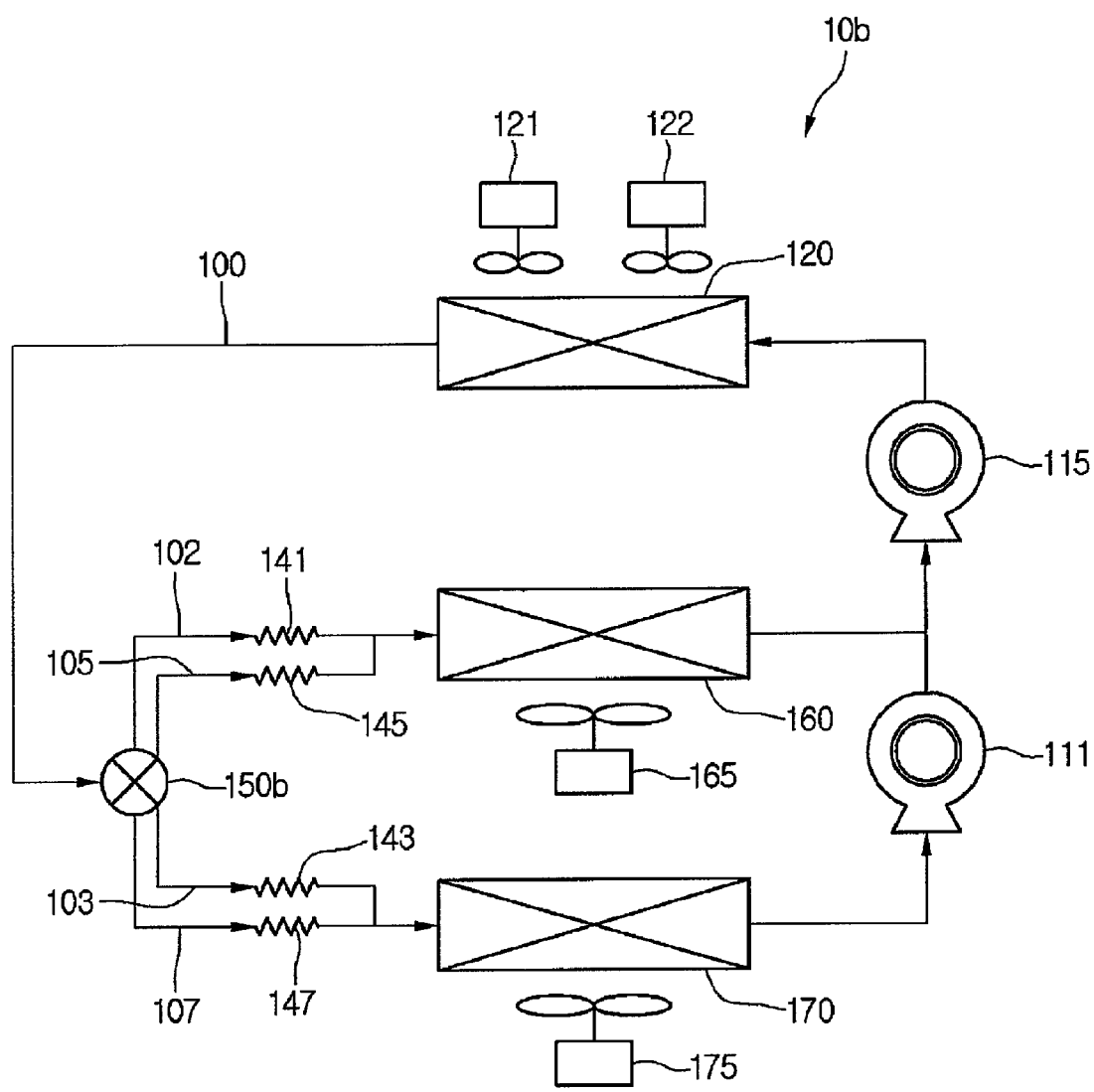
FIG. 13 is a schematic diagram of a refrigerator according to still another embodiment.
Figure 14:
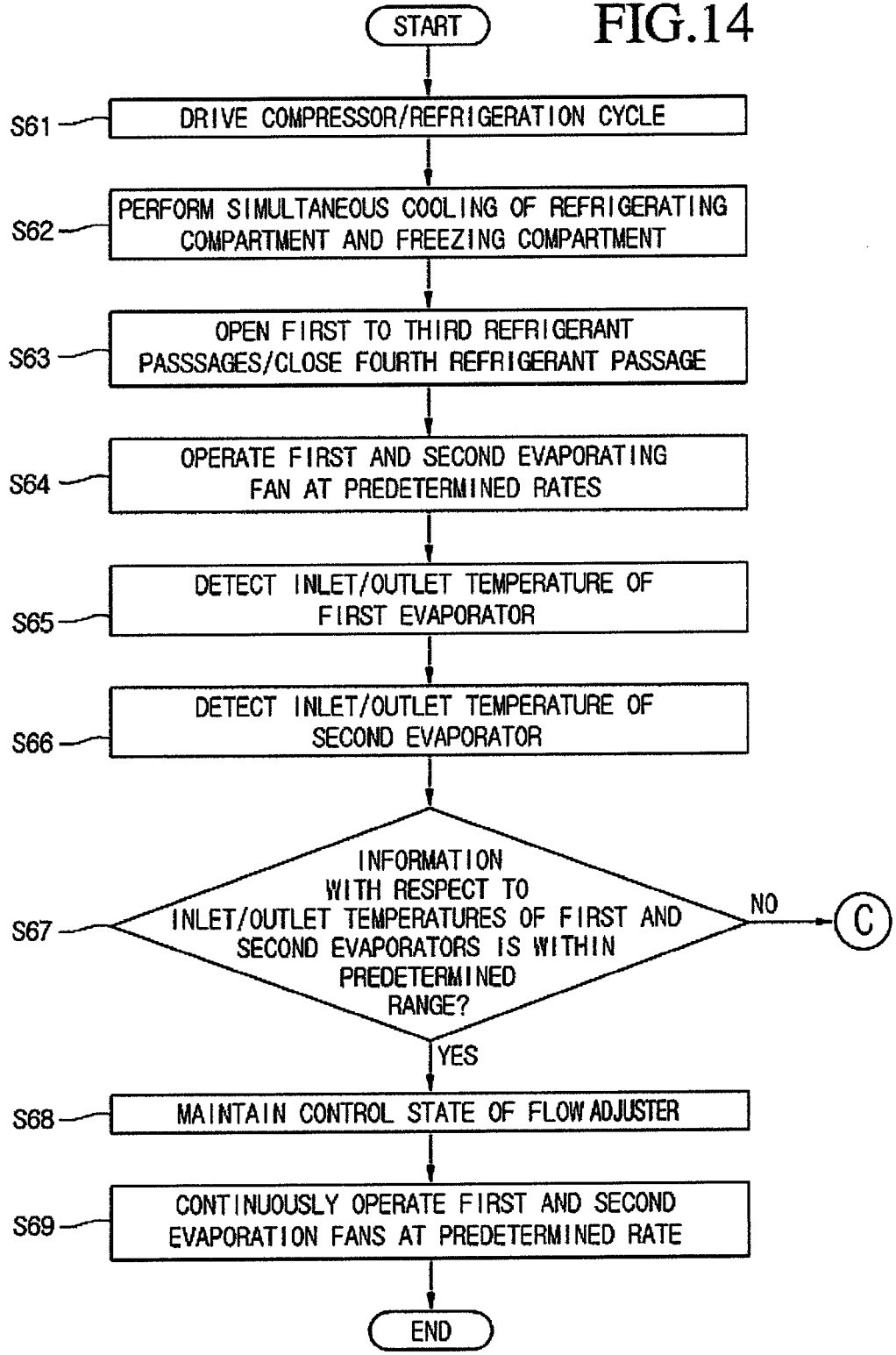
FIGS. 14 and 15 are flowcharts illustrating a method of controlling a refrigerator according to another embodiment.
Figure 15:
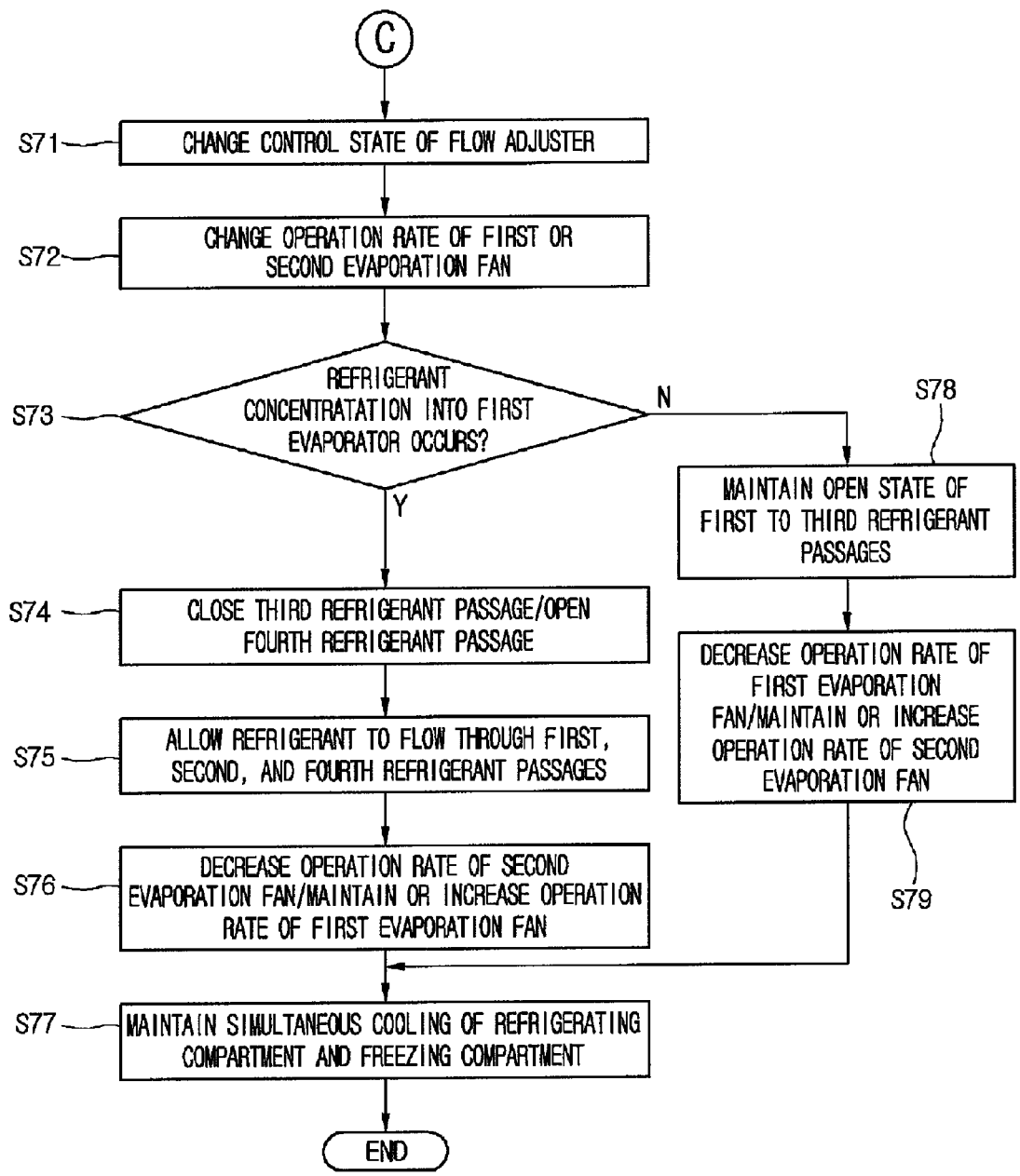

FIG. 13 is a schematic diagram of a refrigerator according to still another embodiment. FIGS. 14 and 15 are flowcharts illustrating a method of controlling a refrigerator according to another embodiment.

Referring to FIG. 13, a refrigerator 10b according to this embodiment may include refrigerant tube 100 to guide a flow of a refrigerant condensed in condenser 120, a flow adjuster 150b disposed in the refrigerant tube 100 to branch the refrigerant into first and second evaporators 160 and 170, and a plurality of refrigerant passages 102, 103, 105, and 107 that extend from an outlet side of the flow adjuster 150b to the first and second evaporators 160 and 170. First evaporation fan 165 may be disposed on or at one side of the first evaporator 160, and second evaporation fan 175 disposed on or at one side of the second evaporator 170.

The plurality of refrigerant passages 102, 103, 105, and 107 may be understood as "branch passages" that are branched from the refrigerant tube 100. The plurality of refrigerant passages 102, 103, 105, and 107 may include first and third refrigerant passages 102 and 105 connected to the first evaporator 160, and second and fourth refrigerant passages 103 and 107 connected to the second evaporator 170.

The first and third refrigerant passages 102 and 105 may be referred to as a "first evaporation passage" in that the first and third refrigerant passages 102 and 105 guide introduction of the refrigerant into the first evaporator 160. The second and fourth refrigerant passages 103 and 107 may be referred to as a "second evaporation passage" in that the second and fourth refrigerant passages 103 and 107 guide introduction of the refrigerant into the second evaporator 170.

The refrigerants flowing into the first and third refrigerant passages 102 and 105 may be mixed with each other, and then, may be introduced into the first evaporator 160. The refrigerants flowing into the second and fourth refrigerant passages 103 and 107 may be mixed with each other, and then, may be introduced into the second evaporator 170. The refrigerant discharged from the second evaporator 170 may be suctioned into the first compressor 111, and the refrigerant compressed in the first compressor 111 may be mixed with the refrigerator discharged from the first evaporator 160, and then, the mixture may be introduced into the second compressor 115.

A plurality of expansion devices 141, 143, 145, and 147 may be disposed in the plurality of refrigerant passages 102, 103, 105, and 107. Each of the plurality of expansion devices 141, 143, 145, and 147 may include a capillary tube. In detail, the plurality of expansion devices 141, 143, 145, and 147 may include first expansion device 141 disposed in the first refrigerant passage 102, second expansion device 143 disposed in the second refrigerant passage 103, third expansion device 145 disposed in the third refrigerant passage 105, and fourth expansion device 147 disposed in the fourth refrigerant passage 107.

The flow adjuster 150b may include a five-way valve having one inflow, through which the refrigerant may be introduced, and four discharges, through which the refrigerant may be discharged. The four discharges may be connected to the first to fourth refrigerant passages 102, 103, 105, and 107.

At least one of the first and third refrigerant passages 102 and 105, and at least one of the second and fourth refrigerant passages 103 and 104 may be opened according to control of the flow adjuster 150b. For example, when the first to third refrigerant passages 102, 103, and 105 are opened, and the fourth refrigerant passage 107 is closed, an amount of refrigerant introduced into the first evaporator 160 may be greater than an amount of refrigerant introduced into the second evaporator 170. On the other hand, when the first, second, and fourth refrigerant passages 102, 103, and 107 are opened, and the third refrigerant passage 105 is closed, an amount of refrigerant introduced into the second evaporator 170 may be greater than an amount of refrigerant introduced into the first evaporator 160.

Referring to FIGS. 14 and 15, when the first and second compressors 111 and 115 operate, a refrigeration cycle through compression-condensation-expansion-evaporation of the refrigerant may operate, in step S61. Cooling operations of the refrigerating compartment and the freezing compartment may be performed at a same time according to the operation of the refrigeration cycle, in step S62. To perform the cooling operations of the refrigerating compartment and the freezing compartment at the same time, flow adjuster 150b may be controlled to open the first to third refrigerant passages 102, 103, and 105, and close the fourth refrigerant passage 107, in step S63.

In this embodiment, when operation of the refrigerator starts, a state in which the first to third refrigerant passages 102, 103, and 105 are opened, and the fourth refrigerant passage 107 is closed may be described as an initial default. However, alternatively, a state in which all of the first to fourth refrigerant passages 101, 103, 015, and 107 are opened may be set as the initial default.

While performing the simultaneous cooling operation, the first and second evaporation fans 165 and 175 may operate at the first and second predetermined rates, respectively, in step S64. The second predetermined rate of the second evaporation fan 175 may be an approximately middle rate, and the first predetermined rate of the first evaporation fan 165 may be an approximately middle rate or high rate.

Inlet and outlet temperatures of first evaporator 160 and inlet and outlet temperatures of second evaporator 170 may be detected, in steps S65, S66. The controller 200 may recognize whether the refrigerant concentration phenomenon into the first or second evaporator 160 or 170 occurs according to whether information with respect to the inlet/outlet temperature differences of the first and second evaporators 160 and 170 are within a predetermined range.

If it is recognized that the refrigerant concentration phenomenon into the first or second evaporator 160 and 170 does not occur, a control state of the flow adjuster 150b may be maintained, in step S68. That is, the flow adjuster 150b may be controlled to open the first to third refrigerant passages 102, 103, and 105, and close the fourth refrigerant passage 107. Also, the first and second evaporation fans 165 and 175 may continuously operate at the first and second predetermined rates, respectively, in step S69.

On the other hand, if it is recognized that the refrigerant concentration phenomenon occurs in the first or second evaporator 160 or 170, the control state of the flow adjuster 150b may be changed, and the first or second evaporation fan 165 or 175 may be changed in operation rate, in steps S71, S72. If the refrigerant concentration phenomenon occurs in the first evaporator 160, the third refrigerant passage 105 may be closed, and the fourth refrigerant passage 107 may be opened to control a flow of the refrigerant through the first, second, and fourth refrigerant passages 102, 103, and 107. The first refrigerant passage 102 may be closed instead of the third refrigerant passage 105. In this case, an amount of refrigerant introduced into the first evaporator 160 may decrease, and an amount of refrigerant introduced into the second evaporator 170 may increase to solve the refrigerant concentration phenomenon in the first evaporator 160, in steps S73, S74, S75.

Also, as the operation rate of the second evaporation fan 175 decreases, the second evaporation fan 175 may operate at a rate lower than the second predetermined rate, for example, the low rate. Also, as the operation rate of the first evaporation fan 165 is maintained or increases, the first evaporation fan 165 may be maintained at the first predetermined rate or operate at a rate higher than the first predetermined rate. For example, the first evaporation fan 165 may operate at the middle or high rate.

When the operation rate of the second evaporation fan 175 decreases, and the operation rate of the first evaporation fan 165 is maintained or increases, the refrigerant may further flow toward the second evaporator 170 than the first evaporator 160 due to the evaporation pressure difference between the first and second evaporations 160 and 170. Thus, the refrigerant concentration phenomenon into the first evaporator 160 may be reduced, in step S76. Also, in addition to the reduced refrigerant concentration phenomenon, the simultaneous cooling operation for the refrigerating compartment and the freezing compartment may be continuously performed, in step S77.

If the refrigerant concentration phenomenon occurs in the second evaporator 170, the opened states of the first to third refrigerant passages 102, 103, and 105 may be maintained, in step S68. Also, as the operation rate of the first evaporation fan 165 decreases, the first evaporation fan 165 may operate at a rate lower than the first predetermined rate. For example, the first evaporation fan 165 may operate at the low rate. Also, as the operation rate of the second evaporation fan 175 is maintained or increases, the second evaporation fan 175 may be maintained at the second predetermined rate or operate at a rate higher than the second predetermined rate. For example, the second evaporation fan 175 may operate at the middle or high rate.

When the operation rate of the first evaporation fan 165 decreases, and the operation rate of the second evaporation fan 175 is maintained or increases, the refrigerant passing through the flow adjuster 150b may further flow toward the first evaporator 160 than the second evaporator 170 due to the evaporation pressure difference between the first and second evaporations 160 and 170. Thus, the refrigerant concentration phenomenon into the second evaporator 170 may be reduced, in step S79.

Figure 16:
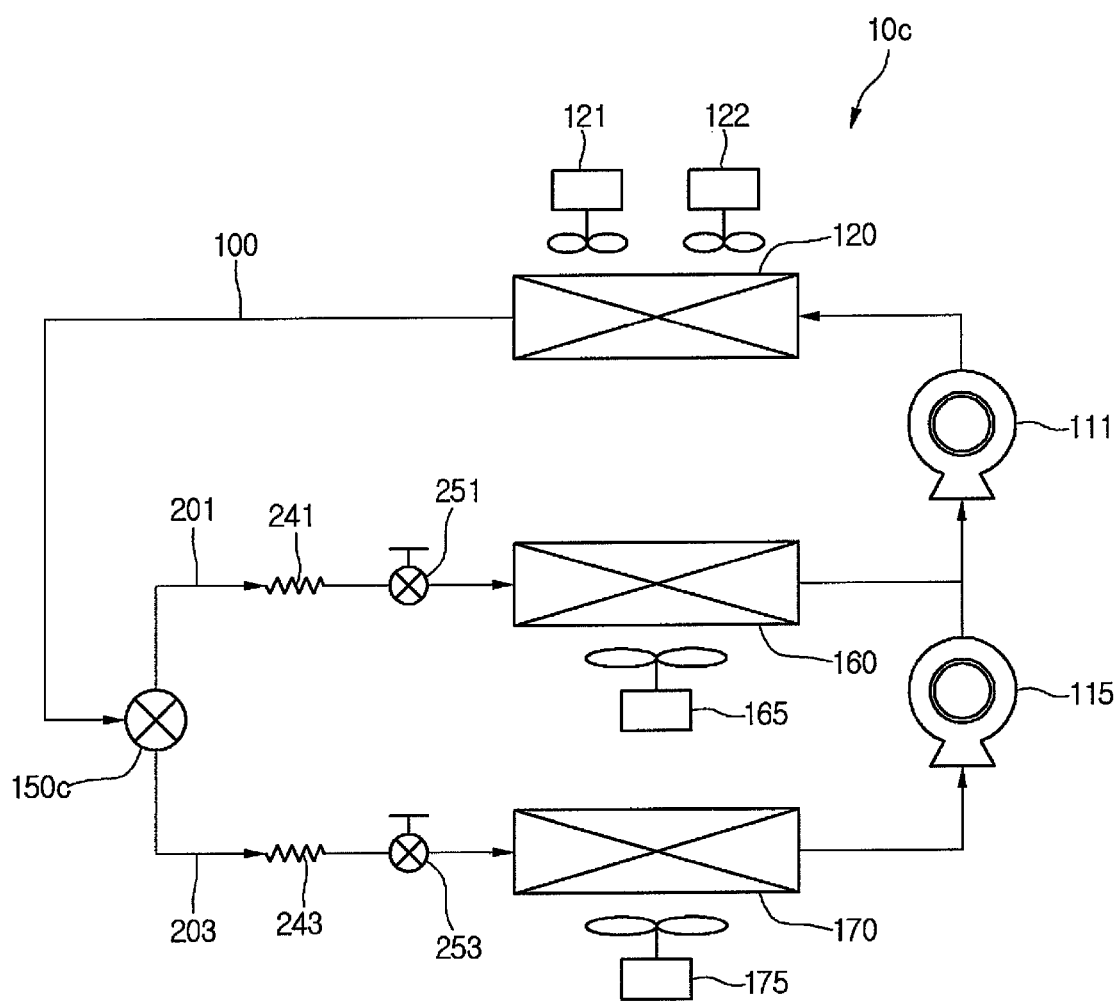
FIG. 16 is a schematic diagram of a refrigerator according to still another embodiment.
Figure 17:
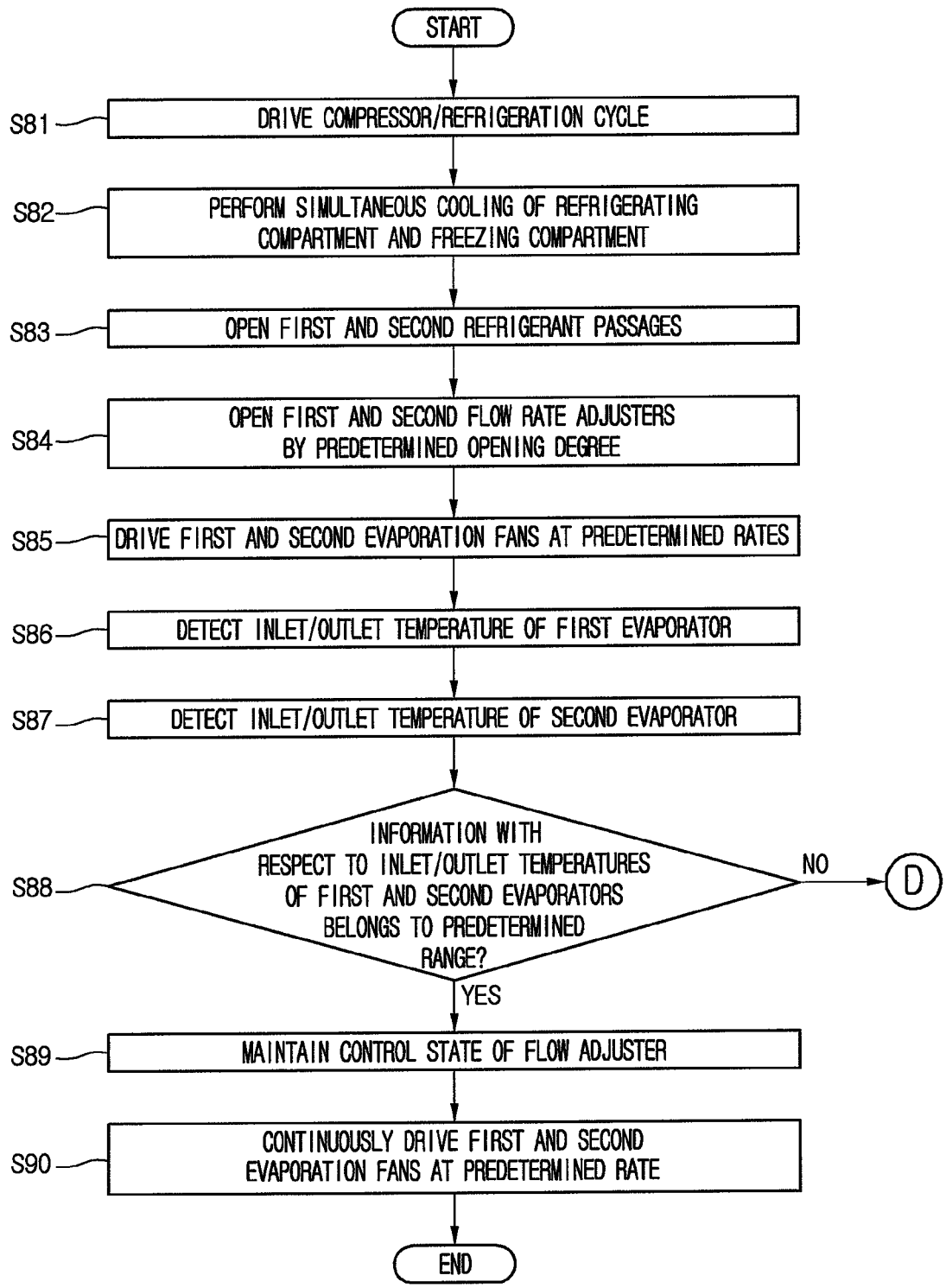
FIGS. 17 and 18 are flowcharts illustrating a method of controlling a refrigerator according to still another embodiment.
Figure 18:
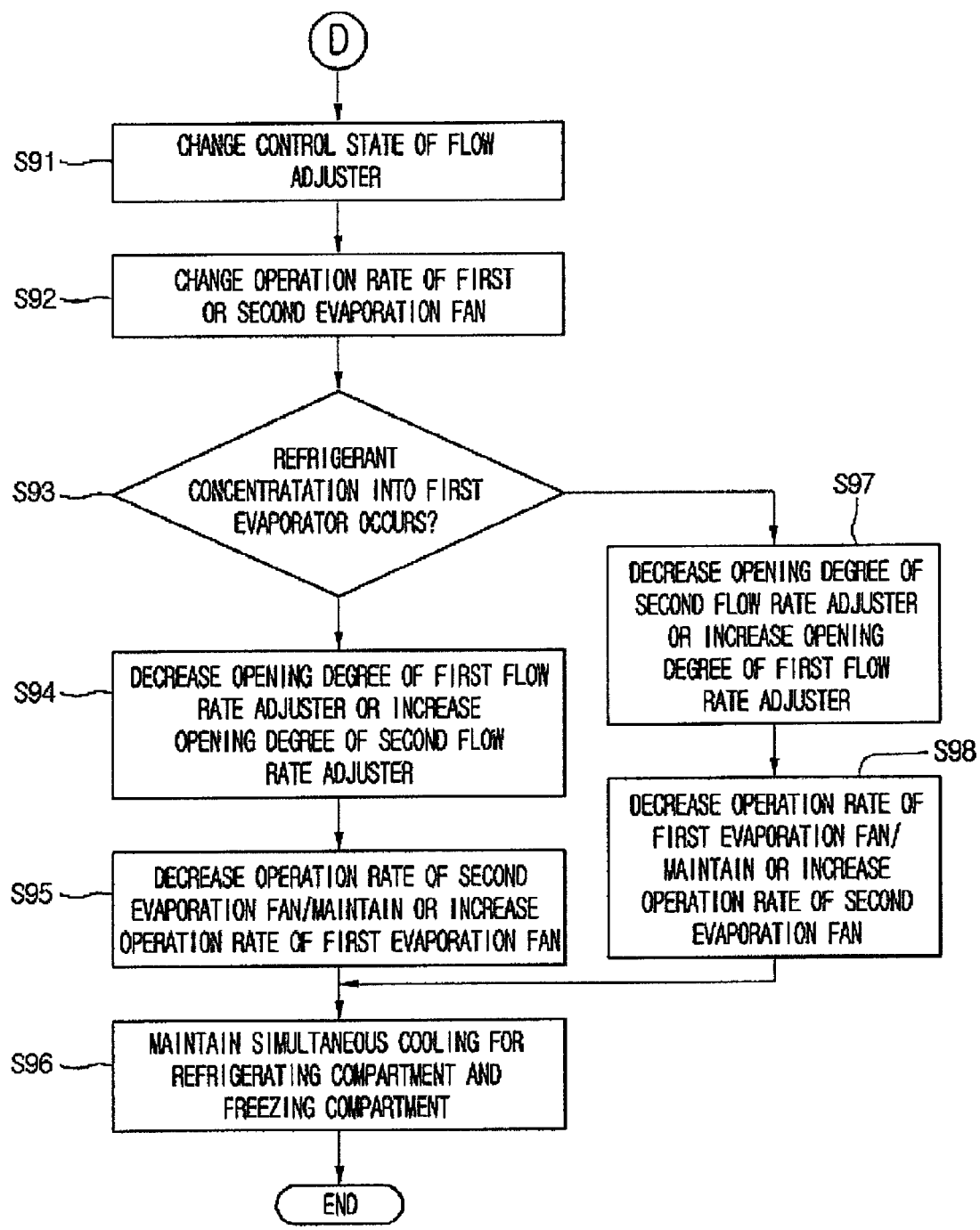

FIG. 16 is a schematic diagram a refrigerator according to still another embodiment. FIGS. 17 and 18 are flowcharts illustrating a method of controlling a refrigerator according to still another embodiment.

Referring to FIG. 16, a refrigerator 10c according to this embodiment may include refrigerant tube 100 to guide a flow of a refrigerant condensed in condenser 120, a flow adjuster 150c disposed in the refrigerant tube 100 to branch the refrigerant into first and second evaporators 160 and 170, and a plurality of refrigerant passages 201 and 203 that extend from an outlet side of the flow adjuster 150c to the first and second evaporators 160 and 170.

The plurality of refrigerant passages 201 and 203 may be understood as "branch passages" that are branched from the refrigerant tube 100. The plurality of refrigerant passages 201 and 203 may include a first refrigerant passage 201 connected to the first evaporator 160 and a second refrigerant passage 203 connected to the second evaporator 170.

A plurality of expansion devices 241 and 243 may be disposed in the plurality of refrigerant passages 201 and 203. Each of the plurality of expansion devices 241 and 243 may include a capillary tube. In detail, the plurality of expansion devices 241 and 243 may include first expansion device 241 disposed in the first refrigerant passage 201, and second expansion device 243 disposed in the second refrigerant passage 203.

The flow adjuster 150c may include a three-way valve having one inflow, through which the refrigerant may be introduced, and two discharges, through which the refrigerant may be discharged. The two discharges may be connected to the first and second refrigerant passages 201 and 230. The flow adjuster 150c may be controlled so that the refrigerant is introduced into the first and second refrigerant passages 201 and 203 at a same time.

The refrigerator 10c may further include flow amount adjusters 251 and 253 to adjust a flow of the refrigerant. The flow amount adjusters 251 and 253 may be disposed in at least one refrigerant passage of the first and second refrigerant passages 201 and 203. For example, the flow rate adjusters 251 and 253 may include first flow rate adjuster 251 disposed in the first refrigerant passage 201, and second flow rate adjuster 253 disposed in the second refrigerant passage 203. Each of the first and second flow rate adjusters 251 and 253 may include an electric expansion valve (EEV), an opened degree of which is adjustable.

Although the first and second flow rate adjusters 251 and 253 are, respectively, disposed at outlet sides of the first and second expansion devices 241 and 243 in FIG. 16, embodiments are not limited thereto. For example, the first and second flow rate adjusters 251 and 253 may be disposed at inlet sides of the first and second expansion devices 241 and 243.

If the opening degree of the first or second flow rate adjusters 251 or 253 decreases, an amount of refrigerant flowing through the opening may decrease. On the other hand, if the opened degree of the first or second flow rate adjusters 251 or 253 increases, an amount of refrigerant flowing through the opening may increase.

For example, if the opening degree of the second flow rate adjuster 253 is relatively greater than the opening degree of the first flow rate adjuster 251, a larger amount of refrigerant may flow into the first refrigerant passage 201. On the other hand, if the opening degree of the second flow rate adjuster 253 is relatively greater than the opening degree of the first flow rate adjuster 251, a larger amount of refrigerant may flow into the second refrigerant passage 203.

As the first and second flow rate adjusters 251 and 253 are provided, the opening degree of each of the refrigerant passages may be finely adjusted. Thus, an amount of refrigerant to be introduced into the first or second evaporator 160 or 170 may be finely adjustable. As a result, while the first and second evaporators operate, the refrigerant concentration phenomenon into the first or second evaporator 160 or 170 may be prevented.

A method of controlling a refrigerator according to another embodiment will be described with reference to FIGS. 17 and 18. Referring to FIGS. 17 and 18, when first and second compressor 111 and 115 are driven to operate the refrigerator, a refrigeration cycle through compression-condensation-expansion-evaporation of the refrigerant may operate, in step S71. Cooling operations of a refrigerating compartment and a freezing compartment may be performed at a same time according to operation of the refrigeration cycle, in step S82. To perform the cooling operations of the refrigerating compartment and the freezing compartment at the same time, the flow adjuster 150c may be controlled to open the first and second refrigerant passages 201 and 203, in step S83. Also, the first and second flow rate adjusters 251 and 253 may be opened by a predetermined opening degree, in step S84.

While performing the simultaneous cooling operation, first and second evaporation fans 165 and 175 may operate at first and second predetermined rates, respectively. The second predetermined rate of the second evaporation fan 175 may be an approximately middle rate, and the first predetermined rate of the first evaporation fan 165 may be an approximately middle rate or high rate, in step S85.

Inlet and outlet temperatures of first evaporator 160 and inlet and outlet temperatures of second evaporator 170 may be detected, in steps S86, S87. The controller 200 may recognize whether the refrigerant concentration phenomenon into the first or second evaporator 160 or 170 occurs according to whether information with respect to the inlet/outlet temperature differences of the first and second evaporators 160 and 170 are within a predetermined range.

If it is recognized that the refrigerant concentration phenomenon into the first or second evaporator 160 and 170 does not occur, a control state of the flow adjuster 150c may be maintained, in step S89. That is, the opened state of each of the flow rate adjusters 251 and 253 may be maintained. Also, the first and second evaporation fans 165 and 175 may continuously operate at the first and second predetermined rates, respectively, in step S90.

On the other hand, if it is recognized that the refrigerant concentration phenomenon occurs in the first or second evaporator 160 or 170, the control state of each of the first and second flow adjuster 251 and 253 may be changed, and the first or second evaporation fan 165 or 175 may be changed in operation rate, in steps S91, S92.

If the refrigerant concentration phenomenon occurs in the first evaporator 160, at least one of a control of decreasing an opening degree of the first flow rate adjuster 251 and a control of increasing an opening degree of the second flow rate adjuster 253 may be performed, in step S94. Also, as the operation rate of the second evaporation fan 175 decreases, the second evaporation fan 175 may operate at a rate lower than the second predetermined rate, for example, the low rate. Also, as the operation rate of the first evaporation fan 165 is maintained or increases, the first evaporation fan 165 may be maintained at the first predetermined rate or operate at a rate higher than the first predetermined rate. For example, the first evaporation fan 165 may operate at the middle or high rate.

When the operation rate of the second evaporation fan 175 decreases, and the operation rate of the first evaporation fan 165 is maintained or increases, the refrigerant may further flow toward the second evaporator 170 than the first evaporator 160 due to the evaporation pressure difference between the first and second evaporations 160 and 170. Thus, the refrigerant concentration phenomenon into the first evaporator 160 may be reduced, in step S95.

As a result, an amount of refrigerant introduced into the first evaporator 160 may decrease, and an amount of refrigerant introduced into the second evaporator 170 may increase to solve the refrigerant concentration phenomenon in the first evaporator 160. Also, in addition to the reduced refrigerant concentration phenomenon, the simultaneous cooling operation for the refrigerating compartment and the freezing compartment may be continuously performed, in step S96.

If the refrigerant concentration phenomenon occurs in the first evaporator 170, at least one of the control of decreasing the opening degree of the second flow rate adjuster 253 and the control of increasing the opening degree of the first flow rate adjuster 251 may be performed, in step S97. Also, as the operation rate of the first evaporation fan 165 decreases, the first evaporation fan 165 may operate at a rate lower than the first predetermined rate. For example, the first evaporation fan 165 may operate at the low rate. Also, as the operation rate of the second evaporation fan 175 is maintained or increases, the second evaporation fan 175 may be maintained at the second predetermined rate or operate at a rate higher than the second predetermined rate. For example, the second evaporation fan 175 may operate at the middle or high rate.

When the operation rate of the first evaporation fan 165 decreases, and the operation rate of the second evaporation fan 175 is maintained or increases, the refrigerant passing through the flow adjuster 150c may further flow toward the first evaporator 160 than the second evaporator 170 due to the evaporation pressure difference between the first and second evaporations 160 and 170. Thus, the refrigerant concentration phenomenon into the second evaporator 160 may be reduced, in step S98.

As described above, when the refrigerant concentration phenomenon occurs in the first or second evaporator 160 or 170, the opening degree of each of the first and second flow rate adjusters 251 and 253 and the operation rate of each of the first and second evaporation fans 165 and 175 may be changed to solve the refrigerant concentration phenomenon, and refrigerating compartment and the freezing compartment may be cooled at the same time.

According to embodiments disclosed herein, as the plurality of condensing fans are disposed within the machine room, sufficient air flow for the heat exchange in the condenser may be generated, and thus, the heat-exchange efficiency of the condenser may be improved. More particularly, the plurality of condensing fans may be disposed on or at a side of the condenser substantially in parallel to each other. As a width of an area on which the plurality of condensing fans are disposed may be greater than a width of the condenser, air may uniformly pass over a whole region of the condenser.

Also, the plurality of condensing fans may be disposed on the base, but may not be disposed on the drain pan, so that an installation position of the condensing fans may be lowered. Therefore, the machine room may be reduced in height. Also, as only the condenser is disposed on the drain pan, the condenser may increase in size. Therefore, an amount of condensed heat may increase.

Also, as the plurality of condensing fans rotate to generate the air flow, a rotation number or rate of each of condensing fans may be less. Therefore, noise due to operation of the fan may be reduced. Further, a distance between the condensing fan and the drain pan may be spaced by a preset or predetermined distance or more from each other to prevent an eddy current between the condensing fan and the drain pan, thereby reducing an amount of flowing air and an occurrence of noise.

Additionally, as the plurality of condensing fans operate at a same time, a phenomenon in which backflow occurs through the condensing fan when the plurality of condensing fans alternately operate may be prevented.

Also, when the plurality of condensing fans are controlled in pulse through duty input, a detected rotation number may be feedback to control the plurality of condensing fans so that the condensing fans may rotate at a same rotation number or rate. Also, noise occurring due to a beat phenomenon of the plurality of condensing fans may be reduced.

Additionally, the plurality of evaporators may operate at the same time to effectively cool the plurality of storage compartments. More particularly, a plurality of refrigerant passages may be provided at an inlet side of at least one evaporator of the plurality of evaporators, and an expansion device may be provided in each of the refrigerant passages to control the flow of the refrigerant.

Further, as a flow rate of the refrigerant introduced into the evaporator is determined on the basis of inlet/outlet temperatures of the evaporator, and the flow adjuster is controlled according to excess or leakage of the refrigerant, the refrigerant may be effectively distributed into the plurality of evaporators. Therefore, the refrigerant concentration phenomenon into one evaporator of the plurality of evaporators may be prevented, and even through the refrigerant concentration phenomenon into a specific evaporator may occur, refrigerant may be uniformly distributed.

Also, if it is recognized that the refrigerant is concentrated into a specific evaporator, a rotation number or rate of the evaporation fan provided on a side of each of the evaporators may be adjusted to uniformly distribute the refrigerant. More particularly, the rotation number of the evaporation fan in which the refrigerant is leaking may relatively decrease, and the rotation number of the evaporation fan in which the refrigerant concentration phenomenon occurs may relatively increase to prevent the refrigerant from being concentrated into one side.

Also, as the rotation number of the evaporation fan may be adequately adjusted according to whether the refrigerant concentration phenomenon occurs, fan operation input may be reduced, and thus, power consumption may be reduced when compared to a case in which the evaporation fan rotates at the same rotation number.

Also, as the flow rate adjuster of which an opening degree is adjustable is provided in the plurality of refrigerant passages, a flow rate of the refrigerant may be accurately controlled.

Embodiments disclosed herein provide a refrigerator that is capable of improving heat-exchange efficiency while reducing a volume of a machine room and efficiently performing cooling with respect to a plurality of storage compartments and a method of controlling a refrigerator.

Embodiments disclosed herein provide a refrigerator that may include a machine room defined in or at one side of a storage compartment; a base that defines a bottom surface of the machine room; a compressor seated on the base to compress a refrigerant; a condenser that condenses a refrigerant compressed in the compressor, the condenser being disposed on one side of the compressor; a drain pan disposed on or at the base to store condensed water generated in the condenser; and a fan assembly coupled to the base to generate an air flow within the machine room. The fan assembly may include a plurality of condensation fans.

The fan assembly may be spaced a preset or predetermined distance in an outward direction from the drain pan. The preset distance may range from about 20 mm to about 40 mm.

The fan assembly may include a first condensation fan; a second condensation fan coupled to or at one side of the first condensation fan; and a housing disposed to surround the first and second condensation fans. The housing may be coupled to a top surface of the base.

A width of the fan assembly in one direction may be greater than a width of the condenser in the one direction. The first and second condensation fans may be disposed on or at one side of the condenser substantially parallel to each other.

The compressor may include a first compressor to primarily compress the refrigerant, and a second compressor to additionally compress the refrigerant compressed in the first compressor. The first compressor and one condensation fan of the plurality of condensation fans may form one row, and the second compressor and the other condensation fan of the plurality of condensation fans may form another row.

The fan assembly may be disposed between the compressor and the condenser.

The refrigerator may further include a control unit or controller to apply an electrical signal to allow the plurality of condensation fans to be turned on or off at a same time. The control unit may control a duty value that defines a pulse value applied into the plurality of condensation fans.

The refrigerator may further include a rotation number or rate detector that detects a rotation number or rate of each of the plurality of condensation fans to feedback information with respect to the detected rotation number into the control unit. The control unit may control the rotation number of each of the plurality of condensation fans so that the rotation numbers accord or correspond to each other on the basis of the information transmitted into the rotation number detection unit.

The control unit may input a preset duty value into the plurality of condensation fans, when the plurality of condensation fans have a same rotation number or rate, or a difference between the rotation numbers or rates of the plurality of condensation fans is within a preset or predetermined value. The preset duty value may be maintained, and when the difference between the rotation numbers of the plurality of condensation fans is above the preset value, the duty value of the condensation fan having a lower rotation number may be changed.

The refrigerator may further include a plurality of evaporators including first and second evaporators to evaporate the refrigerant; a plurality of evaporation fans including first and second evaporation fans that are, respectively, disposed on or at sides of the first and second evaporators; a plurality of temperature sensors that detects or senses refrigerant inlet/outlet temperatures of the first and second evaporators; and a control unit or controller that recognizes whether the refrigerant is concentrated into or at one side of the first or second evaporator on the basis of at least one information of information with respect to the refrigerant inlet/outlet temperatures of the first evaporator or information with respect to the refrigerant inlet/outlet temperatures of the second evaporator. The control unit may reduce a rotation number or rate of the second evaporation fan to increase or maintain the rotation number or rate of the first evaporation fan when the refrigeration concentration into the first evaporator is recognized.

Embodiments disclosed herein further provide a method of controlling a refrigerator including a compressor, a condenser, an expansion devices, and first and second evaporators. The method may include operating the compressor; applying a preset or predetermined pulse value into a plurality of condensation fans to blow air into the condenser to operate the plurality of condensation fans at a same time; detecting a rotation number or rate of each of the plurality of condensation fans; and maintaining or changing the preset pulse value on the basis of whether a difference between the rotation numbers of the plurality of condensation fans is above a preset or predetermined value. The operating of the plurality of condensation fans at the same time may include applying the same pulse value into the plurality of condensation fans.

The maintaining or changing of the preset pulse value may include maintaining the preset pulse value when the rotation numbers of the plurality of condensation fans are the same, or the difference between the rotation numbers of the plurality of condensation fans is within the preset value, and changing the preset pulse value when the difference between the rotation numbers of the plurality of condensation fans is above the preset value. The pulse value applied into the condensation fan having a lower rotation number of the plurality of condensation fans may increase.

The method may further include operating a first evaporation fan disposed on or at one side of the first evaporator and a second evaporation fan disposed on or at one side of the second evaporator at a preset or predetermined rate to supply cool air into a refrigerating compartment and a freezing compartment, and changing an operation rate of the first or second evaporation fan on the basis of whether concentration of a refrigerant into the first or second evaporator occurs. The refrigerant may be branched to flow into the first and second evaporators, and the changing of the operation rate may include decreasing the operation rate of the second evaporation fan and maintaining or increasing the operation rate of the first evaporation fan when the concentration of the refrigerant into the first evaporator occurs.

The operating of the first and second evaporation fans at the preset rate may include operating the first evaporation fan at a middle or high rate; and operating the second evaporation fan at the middle rate. When the concentration of the refrigerant into the first evaporator occurs, the second evaporation fan may operate at a low rate, and the first evaporation fan may operate at the middle or high rate.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
   a machine room defined in or at one side of a storage compartment;
   a base that defines a bottom surface of the machine room;
   a plurality of compressors seated on the base to compress a refrigerant, the plurality of compressors including a first compressor to primarily compress the refrigerant and a second compressor to additionally compress the refrigerant compressed in the first compressor;
   a condenser to condense the refrigerant compressed in the plurality of compressors, the condenser being disposed on or at one side of the plurality of compressors;
   a drain pan disposed on the base to store condensed water generated in the condenser;
   a fan assembly coupled to the base to generate an air flow within the machine room, wherein the fan assembly comprises first and second condensation fans;
   a rotation number detector to detect a rotation number of each of the first and second condensation fans; and
   a controller configured to perform feedback control of the rotation number of the first and second condensation fans with respect to the detected rotation number by the rotation number detector, wherein the first compressor and the first condensation fan form a first row, and the second compressor and the second condensation fan form a second row, wherein the controller maintains the rotation numbers of the first and second condensation fans when the rotation numbers of the first and second condensation fans are the same, or a difference between the rotation numbers of the first and second condensation fans is within a predetermined value, and wherein the controller increases the rotation number of one of the first and second condensation fans having a lower rotation number when the difference between the rotation numbers of the first and second condensation fans is above the predetermined value.

2. The refrigerator according to claim 1, wherein the fan assembly is spaced a predetermined distance in an outward direction from the drain pan.

3. The refrigerator according to claim 2, wherein the predetermined distance ranges from about 20 mm to about 40 mm.

4. The refrigerator according to claim 1, wherein the fan assembly further comprises:
   a housing disposed to surround the first and second condensation fans, the housing being coupled to a top surface of the base.

5. The refrigerator according to claim 4, wherein a width of the fan assembly in a first direction is greater than a width of the condenser in the first direction, and wherein the first and second condensation fans are disposed on or at one side of the condenser with respect to a second direction, substantially in parallel to each other.

6. The refrigerator according to claim 1, wherein the first and second condensation fans are disposed side by side at one side of the condenser.

7. The refrigerator according to claim 1, wherein the fan assembly is disposed between the plurality of compressors and the condenser.

8. The refrigerator according to claim 1, wherein the controller applies an electrical signal to allow the first and second condensation fans to be turned on and off at a same time, and wherein the controller controls a duty value that defines a pulse value applied into the first and second condensation fans.

9. The refrigerator according to claim 8, wherein the rotation number detector provides feedback information with respect to the detected rotation number to the controller, and wherein the controller controls the rotation number of each of the first and the second condensation fans such that the rotation numbers correspond to each other on the basis of the feedback information.

10. The refrigerator according to claim 1, further comprising:
   a plurality of evaporators comprising first and second evaporators to evaporate the refrigerant;
   a plurality of evaporation fans comprising first and second evaporation fans that are, respectively, disposed on or at one side of the first and second evaporators; and
   a plurality of temperature sensors to sense refrigerant inlet and outlet temperatures of the first and second evaporators, wherein the controller recognizes whether the refrigerant is concentrated into or at one side of the first evaporator or the second evaporator on the basis of at least one of information with respect to the refrigerant inlet and outlet temperatures of the first evaporator or information with respect to the refrigerant inlet and outlet temperatures of the second evaporator.

11. The refrigerator according to claim 10, wherein the controller reduces a rotation number of the second evaporation fan and increases or maintains a rotation number of the first evaporation fan when a refrigeration concentration in the first evaporator is recognized.

12. The refrigerator according to claim 10, further comprising:
   a plurality of refrigerant flow rate adjusters including first and second flow adjusters disposed on an inlet side of the first and second evaporators.

13. The refrigerator according to claim 12, wherein the controller controls an opening degree of the first and second flow rate adjusters based on a refrigerant concentration in the first and second evaporators.

14. The refrigerator according to claim 1, wherein the drain pan has an approximately hexahedral shape having an open top surface and a predetermined height to store the condensed water.

15. The refrigerator according to claim 14, wherein the height of the drain pan is smaller than a height of the fan assembly.

16. The refrigerator according to claim 10, further comprising:
   a plurality of expansion devices comprising a first expansion device to expand the refrigerant to be introduced into the first evaporator, and a second expansion device to expand the refrigerant to be introduced into the second evaporator.

17. The refrigerator according to claim 16, wherein each of the first expansion device and the second expansion device includes a capillary tube.

18. The refrigerator according to claim 17, wherein a diameter of the capillary tube of the second expansion device is smaller than a diameter of the capillary tube of the first expansion device.

* * * * *